US012093980B2

(12) United States Patent
Franklin et al.

(10) Patent No.: US 12,093,980 B2
(45) Date of Patent: Sep. 17, 2024

(54) TECHNIQUES FOR CONTEXT SENSITIVE OVERLAYS

(71) Applicant: Meta Platforms, Inc., Menlo Park, CA (US)

(72) Inventors: Alexander Salem Franklin, Cupertino, CA (US); Xiao Ou Wang, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 435 days.

(21) Appl. No.: 16/555,801

(22) Filed: Aug. 29, 2019

(65) Prior Publication Data
US 2019/0392483 A1    Dec. 26, 2019

Related U.S. Application Data

(63) Continuation of application No. 14/590,644, filed on Jan. 6, 2015, now abandoned.

(51) Int. Cl.
*G06Q 30/0251* (2023.01)
*G06F 3/0481* (2022.01)
(Continued)

(52) U.S. Cl.
CPC ....... *G06Q 30/0267* (2013.01); *G06F 3/0481* (2013.01); *G06F 3/04817* (2013.01);
(Continued)

(58) Field of Classification Search
CPC ........... G06Q 30/0267; G06Q 30/0269; G06Q 50/01; G06Q 30/0207–0277;
(Continued)

(56) References Cited

U.S. PATENT DOCUMENTS

| 5,779,634 A | 7/1998 | Ema et al. |
| 9,407,816 B1 * | 8/2016 | Sehn ................. G06T 11/60 |

(Continued)

FOREIGN PATENT DOCUMENTS

| JP | 2000-066858 A | 3/2000 |
| WO | WO 2015/128758 A1 | 9/2015 |

OTHER PUBLICATIONS

Office Action received in U.S. Appl. No. 15/000,010, mailed Oct. 24, 2017, 17 pages.
(Continued)

*Primary Examiner* — Chinyere Mpamugo
(74) *Attorney, Agent, or Firm* — McDermott Will & Emery LLP

(57) ABSTRACT

Techniques for context sensitive overlays, comprising a social networking application. The social networking application may include, among other components, a social networking overlay management component to receive a request from a mobile device to determine a list of aggregate overlay information and user context information, and providing the list of aggregate overlay information and user context information to the mobile device, a context determination component to determine the user context information representative of at least one user context based at least partially on user profile information, location information, calendar event information, and/or external event information, and an overlay selection component to generate the list of aggregate overlay information based at least partially on the user profile information, overlay promotion information, and user context information.

20 Claims, 10 Drawing Sheets

*Operating Environment 254*

(51) Int. Cl.
*G06F 3/04817* (2022.01)
*G06F 3/04845* (2022.01)
*G06Q 50/00* (2024.01)

(52) U.S. Cl.
CPC ..... *G06F 3/04845* (2013.01); *G06Q 30/0269* (2013.01); *G06Q 50/01* (2013.01); *G06F 2203/04804* (2013.01)

(58) Field of Classification Search
CPC ............... G06F 3/0481; G06F 3/04845; G06F 3/04817; G06F 2203/04804
See application file for complete search history.

(56) References Cited

U.S. PATENT DOCUMENTS

| | | | |
|---|---|---|---|
| 9,792,733 | B2 | 10/2017 | Rosenthal et al. |
| 2004/0100486 | A1 | 5/2004 | Flamini et al. |
| 2007/0174790 | A1 | 7/2007 | Jing et al. |
| 2010/0002095 | A1 | 1/2010 | Nagao et al. |
| 2012/0069028 | A1* | 3/2012 | Bouguerra ............ H04L 51/046 715/810 |
| 2012/0291120 | A1 | 11/2012 | Griffin |
| 2012/0306920 | A1 | 12/2012 | Bathiche et al. |
| 2013/0282808 | A1 | 10/2013 | Sadanandan et al. |
| 2014/0171039 | A1 | 6/2014 | Bjontegard |
| 2014/0223299 | A1 | 8/2014 | Han |
| 2015/0058239 | A1 | 2/2015 | Lenahan et al. |
| 2015/0172599 | A1 | 6/2015 | Caldwell |
| 2016/0006927 | A1 | 1/2016 | Sehn |
| 2016/0085863 | A1* | 3/2016 | Allen ..................... G06Q 30/08 707/754 |

OTHER PUBLICATIONS

Sara Soueidan, CSS Overlay Techniques, 2013 (Year: 2013).
U.S. Appl. No. 14/590,644, filed Aug. 9, 2019, Office Action.
U.S. Appl. No. 14/590,644, filed Mar. 12, 2018, Office Action.
U.S. Appl. No. 14/590,644, filed Jun. 14, 2018, Office Action.
U.S. Appl. No. 14/590,644, filed Nov. 2, 2018, Office Action.
U.S. Appl. No. 14/590,644, filed Jul. 17, 2019, Office Action.
U.S. Appl. No. 14/590,644, filed Oct. 10, 2019, Office Action.
U.S. Appl. No. 15/000,010, filed Oct. 24, 2017, Office Action.
U.S. Appl. No. 15/000,010, filed May 25, 2018, Office Action.
U.S. Appl. No. 15/000,010, filed Oct. 29, 2018, Office Action.
U.S. Appl. No. 15/000,010, filed Apr. 24, 2019, Office Action.
U.S. Appl. No. 15/000,010, filed Sep. 25, 2019, Notice of Allowance.
Ajanki A., et al., "An Augmented Reality Interface to Contextual Information," Virtual Reality, vol. 15, Jan. 2011, Springer Link [online], SI: Augmented Reality, Published: Dec. 16, 2010, pp. 161-173, Retrieved from the Internet: URL: https://link.springer.com/article/10.1007/s10055-010-0183-5.
Satyanarayan A., et al., "Using Overlays to Support Collaborative Interaction with Display Walls," ACM Intelligent User Interfaces (IUI), Feb. 14-17, 2012, pp. 105-108.
Non-Final Office Action mailed Oct. 21, 2022 for U.S. Appl. No. 17/548,873, filed Dec. 13, 2021, 14 pages.

* cited by examiner

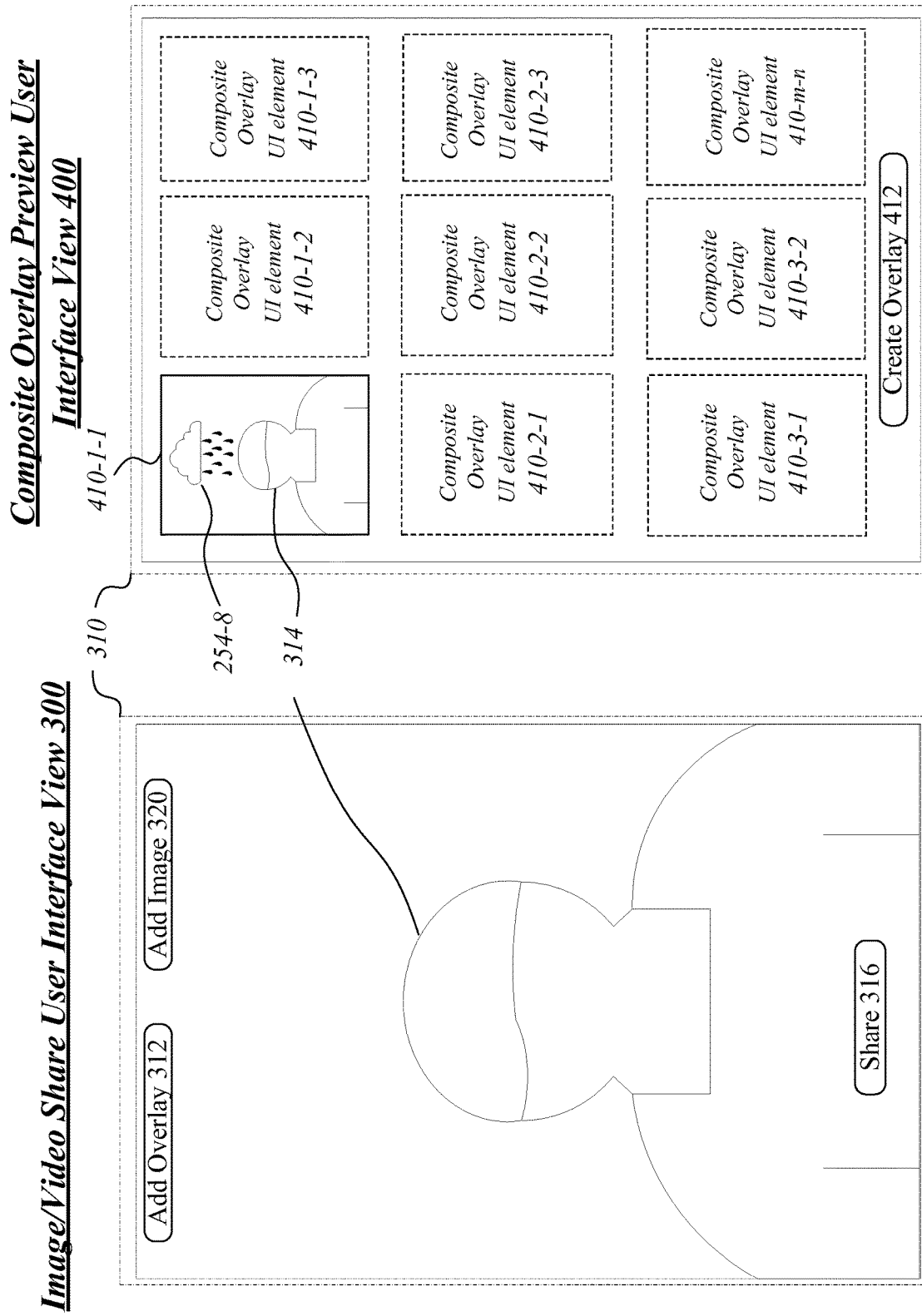

TECHNIQUES FOR CONTEXT SENSITIVE OVERLAYS

CROSS-REFERENCE TO RELATED APPLICATIONS

The present application is a continuation of U.S. application Ser. No. 14/590,644, filed on Jan. 6, 2015. The aforementioned application is hereby incorporated by reference in its entirety.

BACKGROUND

A social networking system, such as a social networking website, enables one or more users to interact with each other in the social networking system by providing social networking services to the one or more users. With the recent increase in mobile devices, numerous users have also begun using their mobile devices to interact with the one or more users in the social networking system such, as, for example, social network messaging services. However, this increase in use of mobile devices to access social networking services has also placed an increased demand for improvements in social network messaging services and social networking services.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for context sensitive overlays. Some embodiments are particularly directed techniques for management of context sensitive overlay user interface (UI) elements. In one embodiment, for example, an apparatus may include a processor circuit, memory operatively coupled to the processor circuit, the memory to store a social networking application comprising a social networking overlay component for execution by the processor circuit. The social networking overlay component may comprise a social networking overlay management component to receive a request from a mobile device to determine a list of aggregate overlay information and user context information, and providing the list of aggregate overlay information and user context information to the mobile device, a context determination component to determine the user context information representative of at least one user context based at least partially on user profile information, location information, calendar event information, and/or external event information, and an overlay selection component to generate the list of aggregate overlay information based at least partially on the user profile information, overlay promotion information, and/or user context information. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates an exemplary image/video share user interface view.

FIG. 4 illustrates a composite overlay preview user interface view.

DETAILED DESCRIPTION

Figure 1A:
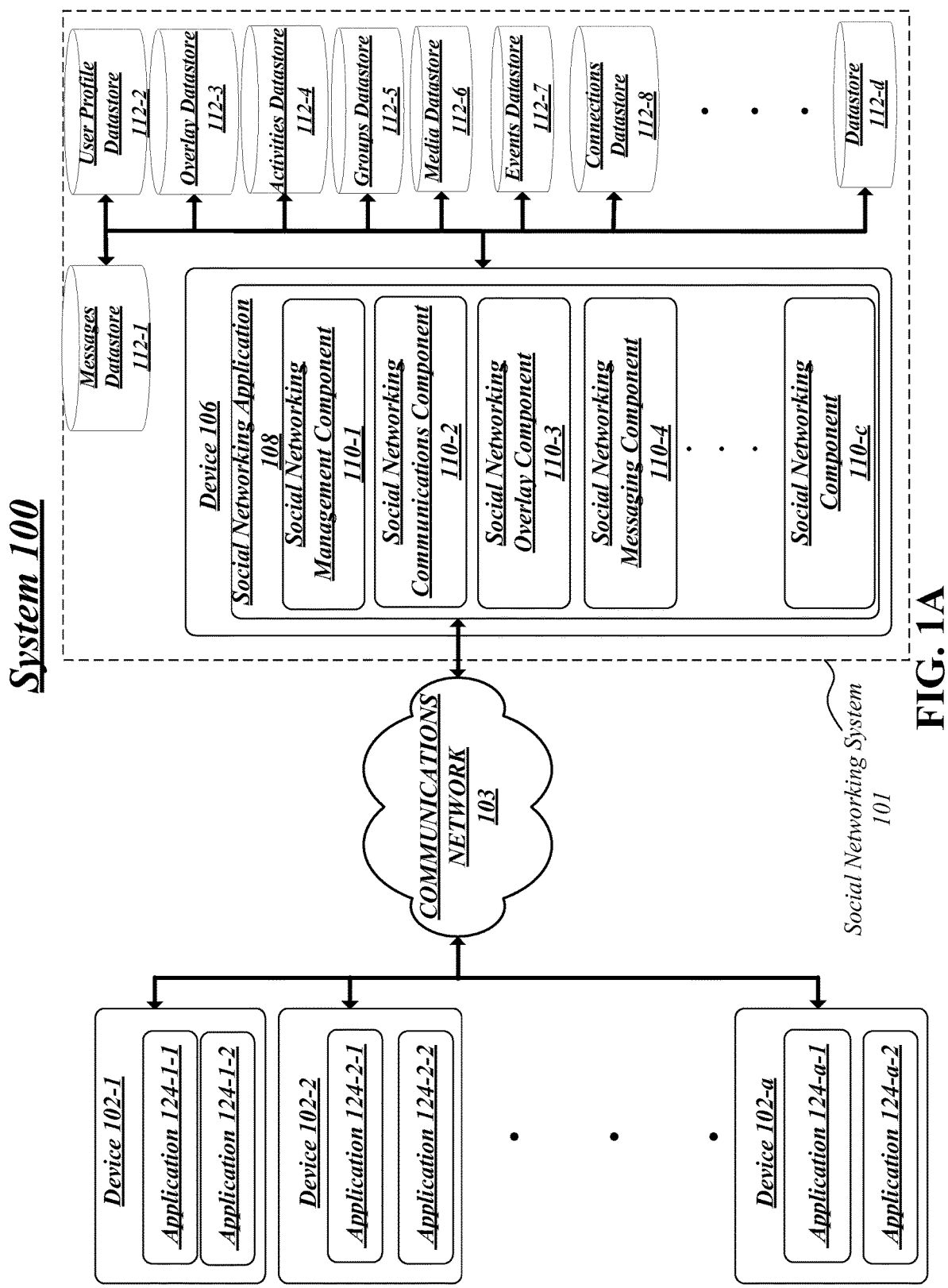
FIG. 1A illustrates an exemplary embodiment of a context sensitive overlay system.

Various embodiments are generally directed to context sensitive overlays. Typically, a mobile application may enable users to take pictures and/or videos of themselves or of others using a camera on their mobile device which may be shared between and among users in a social networking system. To provide users with a more entertaining experience in sharing their pictures and/or videos, a context sensitive overlay system (e.g., context sensitive overlay system 100) may enable users to add one or more graphical features (e.g., overlays, filters, props, etc.) or overlay user interface (UI) elements prior to distribution via the social networking system. In various embodiments, the added overlay UI elements may include, but is not limited to, animated images, short videos, and/or static images.

To ensure that added overlay UI elements are properly positioned, oriented and/or proportioned with respect to the appropriate features (e.g., faces, eyes, mouth, etc.) in images and/or videos for sharing, the context sensitive overlay system may utilize image recognition to position, orient and/or proportion the added overlay UI elements with respect to any detected features in an image and/or video for sharing.

To provide users with additional flexibility in the arrangement and selection of one or more overlay UI elements, the context sensitive overlay system may enable users to manually modify the one or more attributes associated one or more overlay UI elements, such as, for example, position, size, orientation, color, text, and the like. Furthermore, the context sensitive overlay system may also enable users to add their own overlay UI elements based at least partially on existing images the user has in possession on their device. Additionally, the context sensitive overlay system may also enable users to draw a new overlay UI element or modify an existing overlay UI element with additional drawings. Furthermore, the context sensitive overlay system may enable users to add multiple overlay UI elements to an image and/or video for sharing and/or enable users to add multiple images and/or videos with multiple overlay UI elements for sharing in one composite overlay image or video.

To provide users with ease of selecting one or more overlay UI elements, the context sensitive overlay system may render and visually present a grid of composite overlay UI elements, where each composite overlay UI element may include one or more overlay UI elements in proper position, orientation, and/or proportion with respect to an image and/or video the user intends to share. Additionally or alternatively, each composite overlay UI element may also visually present a live preview (e.g., in near real time) of the images and/or video currently being captured in near real time by the camera of the mobile device with the one or more overlay UI elements being visually presented in proper position, orientation, and/or proportion with respect to one or more features detected in the near real time images and/or video.

To ensure that the overlay UI elements visually presented to the users are relevant, the context sensitive overlay system may determine user context information associated with a user. The user context information may identify one or more user contexts (e.g., location of the user, interests of the user, events associated with the user, external events such as holidays, weather, associated with the user, conversation topics of the user, etc.) and may be utilized by the context sensitive overlay system in selecting the relevant overlay UI elements based at least partially on the one or more user contexts that are substantially near or at the time the user is sharing one or more images and/or videos, i.e., context sensitive overlay UI elements. Additionally, the context sensitive overlay system may rank the selected overlay UI elements for visual presentation to the user on a device based at least partially on the overlay UI elements that the user already owns and overlay UI elements the user does not already own.

To provide various entities with advertising opportunities, the context sensitive overlay system may further bias the selection process of one or more overlay UI elements for visual presentation to a user on a mobile device based at least partially on overlay promotion information which may representative of one or more entities that have provided financial interests to the operators and/or owners of the context sensitive overlay system.

To provide incentives for users to share one or more overlay UI elements and consequently, increase brand recognition and/or advertisement opportunities, the context sensitive overlay system may further provide promotions and/or discounts for users who share one or more overlay UI elements and/or the recipient users who received the one or more overlay UI elements. As a result of these improvements discussed above and elsewhere, the users' experiences in sharing images and/or videos on one or more devices may be greatly improved.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the needed purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A illustrates an exemplary embodiment of a context sensitive overlay system 100. In various embodiments, the context sensitive overlay system 100 may comprise a social networking system 101 (e.g., Facebook, Google+, LinkedIn, etc.) and one or more devices 102-*a* (e.g., server devices, mobile devices, computing devices, networking devices, etc.) for providing social networking services to enable various users (e.g., persons, businesses, hardware/software components, computing devices, etc.) to communicate and interact between and among each other. To provide the social networking services to various users, the one or more devices 102-*a* associated with various users may be operatively coupled to the social networking system 101 via communications network 103 (e.g., internet, intranet, cellular network, etc.) utilizing various communications mediums (e.g., wired, wireless, fiber optic, etc.) and/or communications standards (e.g., Ethernet IEEE 802.3, Wireless IEEE 802.11, WiMAX IEEE 802.16, Global Systems for Mobile Communications (GSM), Enhanced Data Rates for GSM Evolution (EDGE), Long Term Evolution (LTE), etc.).

It is worthy to note that "a" and "b" and "c" and similar designators as used herein are intended to be variables representing any positive integer. Thus, for example, if an implementation sets a value for a=2, then a complete set of devices 102-*a* may include devices 102-1 and 102-2. Similarly, if an implementation sets value for a=2, then a complete set of applications 124-*a*-1 may include applications 124-1-1 and 124-2-1. Furthermore, if an implementation sets value for b=6, then a complete set of applications 124-1-*b* may include applications 124-1-1, 124-1-2, 124-1-3, 124-1-4, 124-1-5, and 124-1-6. The embodiments are not limited in this context.

To utilize the social networking services provided by the social networking system 101, each device of the one or more devices 102-*a* may be configured to execute at least applications 124-*a*-1 and/or applications 124-*a*-2. The applications 124-*a*-1 and/or 124-*a*-2 may be configured to communicate with the social networking system 101 via communications network 103 to provide the social networking services to the users. To maintain a persistent presence and ensure secure access to the social networking system 101, each user of applications 124-*a*-1 and/or 124-1-*a*-2 may be associated with a user account in the social networking system 101. Each user account may be represented by user account information. The user account information for each user may include, but is not limited to, user account identifier (e.g., phone number, e-mail address, etc.), user account authentication token (e.g., user account password, physical and/or virtual security tokens, etc.), and/or any other information relevant to the authentication and authorization of each user. To ensure authorized access of each user, the social networking system 101 may be further configured to authenticate each user based on at least a portion of the user account information (e.g., user account identifier, user account authentication token, etc.) provide by each user and received from one or more devices 102-*a*. Once a user having the associated user account has been successfully authenticated, the social networking system 101 may provide the application (e.g., application 124-1-1 and/or application 124-1-2) with one or more time limited access tokens having a set of access permissions associated with the user account of the user to retrieve, store, modify, update, and/or otherwise access information within a specific time period in the social networking system 101 utilizing the application.

Each user account may be further associated with a user profile representative of a user's presence within the social networking system 101. Each user profile associated with each user may be represented by user profile information, which may include, but is not limited to, user identifier information (e.g., a unique identifier that identifies the user and the user profile information), user biographic and/or demographic information, (e.g., user name information which may include, but is not limited to, a first, middle, and/or last name of the user, an entity name associated with the user, contact information of the user, birth date of the user, age of the user, sex of the user, etc.), user profile media information (e.g., profile image(s) of the user, a focused user profile image of the user, etc.), user location information (e.g., the hometown location of the user, the current location of the user, the work location(s) of the user, etc.), user time zone information (e.g., time zone of the user, etc.), user social connections information (e.g., a list of friends, family members, coworkers, teammates, classmates, business associates, of the user), user groups membership information, user interest information (e.g., the interests listed by the user, movies listed by the user, music listed by the user, books listed by the user, approvals or "likes" of the user, or any other information that may identify the user's interest), user employment history information (e.g., list of current and/or past employers of the user), user social messages information (e.g., one or more social networking messages where the user is a recipient), user event information (e.g., one or more social events associated with the user, etc.), user profile discussion information (e.g., one or more profile activities, such as, profile posts in the user profile), user search information (e.g., one or more search queries inputted by the user), user overlay ownership information (e.g., references to one or more overlays UI elements stored in the overlay datastore 112-3 shared with, purchased by, and/or otherwise owned by the user), user overlay usage information (e.g., references to one or more overlay UI elements that are shared with, purchased by, and/or otherwise owned by the user and the associated usage frequency for each overlay UI element, etc.), user overlay preferences information (e.g., preference information to indicate whether to authorize the social networking system 102 and/or one or more devices 102 to scan or otherwise analyze user profile information such as one or more social user social messages information, etc.), and/or any other preference/personal information associated with the user.

Figure 1B:
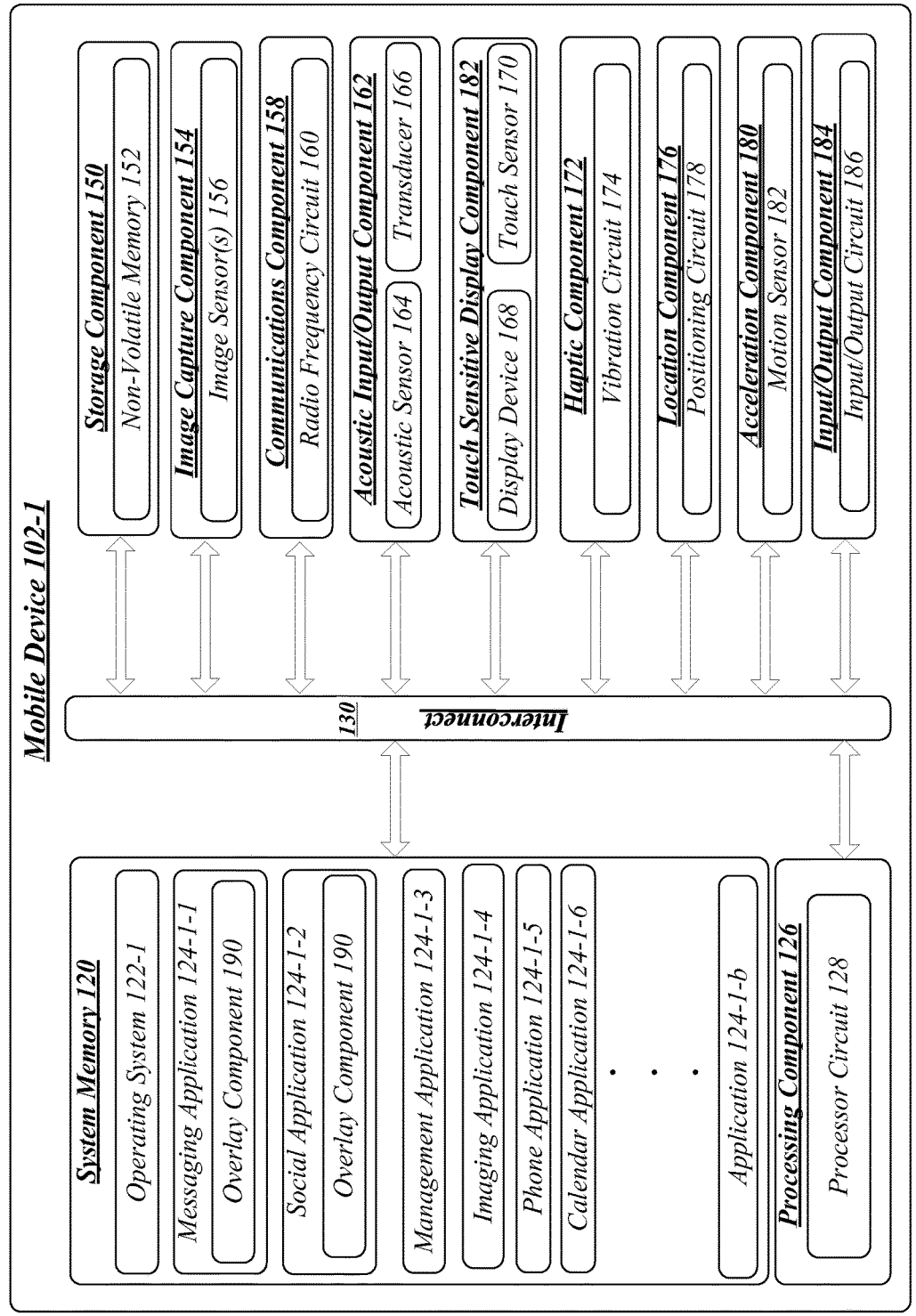
FIG. 1B illustrates an exemplary embodiment of a device, which may be a mobile device, comprising one or more applications.

In some embodiments, the social networking system 101 may enable one or more applications (e.g., social application 124-1-1 and/or 124-1-2 further discussed with respect to FIG. 1B, etc.) of device 102-*a* to retrieve at least a portion of the user profile information associated with the user and display at least a portion of the user profile information on one or more display screens operatively coupled to the devices 102-*a*. To facilitate user interaction between and among users in the social networking system 101, the social networking system 101 may also enable users to search user profile of other users based at least partially on a received search query and at least a portion of the user profile information associated with other users, retrieve at least a portion of the user profile information of the other users, and form one or more social connections with other users by enabling users via the one or more applications of devices 102-*a* to identify other users as the user's friend, family member (e.g., spouse, cousin, mother, father, grandmother, grandfather, brother, sisters, daughter, son, etc.), coworker, teammate, classmate, business associate, or any other social relationship.

It may be appreciated that the social connections formed between a pair of users may be unidirectional, when only one user in the pair of users identifies and acknowledges the type and existence of social relationship. Alternatively, the social connections formed between the pair of users may be bidirectional when both users in the pair of users identify the same type of social relationship and the existence of social relationship. As such, the social networking system 101 further receive, provide, and/or update user social connections information which may include, but is not limited to, a list of social connection information representative of the social connections of the user (e.g., the user identifier information or other resource or social networking object the user is connected to) and the social connection type information representative of a social connection type (e.g., friend, family member, coworker, teammate, classmate, business associate, and/or any other social relationship) associated with each social connection. Based on the user social connections information of a plurality users, the social networking system 101 may be further configured to determine social proximity information which may include, but is not limited to, the degree of separation between one or more pairs of users.

In some embodiments, the social networking system 101 may further enable users to create, publish, or post one or more profile activities (e.g., posts, polls, Universal Resource Identifier/Universal Resource Locator (URI/URL) references, etc.), or any other information on the user's own user profile represented by the user profile information. Additionally, in some embodiments, the social networking system 101 may further enable some users to create, publish, and/or post one or more profile activities on user profiles of other users based at least partially on the user social connection information of the other users. The social networking system 101 may also enable users to send and/or receive private social messages to one or more users by communicating the user social messages information comprising one or more private social messages to and from one or more users.

To provide collaboration and between and among a specific set of users, including between and among users that may not have a social connection with other users in the specific set of users, the social networking system 101 may further enable the association and/or management of one or more groups. In some embodiments, each group may be represented by social group information, which may include, but is not limited to, group identifier information (e.g., a unique identifier that identifies a particular group in the social networking system 101), group privacy information (e.g., group privacy type for the particular group which may include, but is not limited to, secret group type, open group type, or closed group type), group cover image information, group description information (e.g., a description associated with the particular group), group name information (e.g., the group name of the particular group), group owner information (e.g., the owner of the particular group), group location information (e.g., the location of the particular group), group membership information (e.g., a list of group members in the particular group), group membership count information (e.g., a total number of group members in the particular group), or any other information associated with one or more groups.

In some embodiments, the social networking system 101 may enable users to create one or more groups in the social networking system 101 utilizing the one or more applications (e.g., social application 124-1-2 of FIG. 1B, etc.). Moreover, the social networking system 101 may enable users to create one or more groups by receiving at least a portion of the social group information (e.g., group privacy information, group cover image information, group description information, group name information, group owner information, group membership information), and creating a group based at least partially on the received social group information.

In some embodiments, the social networking system 101, may provide users with the latest updates regarding the activities of their social connections, groups, messages, or any other aspects of users' online presence. To provide the latest updates, the social networking system 101 may generate and/or provide users with one or more notifications regarding the activities of their friends, family members, coworkers, teammates, classmates, business associates, and/or any other user in the social networking system 101 (i.e., user notifications), one or more notifications regarding the activities within one or more groups where the users may be group members of (i.e., user group notifications), and/or one or more notifications regarding the activities within one or more forums where the users may be forum members (i.e., user forum notifications).

To provide users with these and other social networking services, the social networking system 101 may comprise server device 106 which may include, among other applications, social networking application 108. The social networking system 101 may further comprise one or more datastores 112-d operatively coupled to the server device 106. The one or more datastores 112-d may be configured to store one or more resources or social networking objects representative of the information received and provided by the social networking system 101. Moreover, the social networking objects of the social networking system 101 may include, but is not limited to, user social messages information for one or more users which may be stored in the messages datastore 112-1, one or more user profiles which may be stored in the user profiles datastore 112-2, one or more overlay UI elements which may be stored in the overlay datastore 112-3, one or more activities (e.g., posts, polls, threads, etc.) which may be stored in the activities datastore 112-4, one or more groups which may be stored in the groups datastore 112-5, media information (e.g., images, videos, files, etc.) which may be stored in media datastore 112-6, one or more events which may be stored in events datastore 112-7 (e.g., social events organized between and among one or more users, etc.), or any other social networking object that may be received, stored, provided, or otherwise tracked and/or accessed by the social networking system 101 to provide the users with these and other social networking services.

The one or more datastores 112-d may further store object connections between two or more objects or resources in the object connections datastore 112-8. Moreover, the object connections may be representative of the relationship or links between the two or more objects. The one or more social networking objects in conjunction with one or more objects connections may form a social graph comprising two or more nodes interconnected via one or more edges, where each node may be representative of a social networking object and each edge may be representative of the object connections between two or more social networking objects in the social networking system 101. To enable the applications 124-a-1 to retrieve, modify, update or otherwise access the various information managed by the social networking system 101 and represented as the social graph, the social networking application 108 may further provide a graph application program interface (API) utilizing various protocols (e.g., HTTP, HTTPs, etc.).

In some embodiments, the social networking application 108 may include one or more social networking components 110-c. At least some of the one or more social networking components 110-c may be arranged to implement at least a portion of the graph API. The one or more social networking components 110-c may include, but is not limited to, a social networking management component 110-1, a social networking communications component 110-2, social networking overlay component 110-3, and/or social networking messaging component 110-4.

The social networking management component 110-1 may be generally arranged to enable association and management of one or more groups by one or more users, enable association and management of one or more user profiles and/or user accounts by one or more users, enable communications between and among one or more users via of one or more messages and/or activities, search for information in the social networking system 101 in response to one or more search queries received from one or more users via applications 124-a-1, and provide search results to one or more users via the one or more applications 124-a-1.

The social networking overlay component 110-3 may be generally arranged to manage the overlay information stored in the overlay datastore 112-3, determine user context information (e.g., user context information 224 further discussed in FIG. 2A, etc.) for one or more users based at least partially on at least a portion of user profile information (e.g., user social messages information, user interest information, user groups membership information, user biographic information, user demographic information, etc.), location information, calendar event information and/or external event information (e.g., weather information, sports information, etc.). Additionally, the social networking overlay component 110-3 may also be generally arranged suggest one or more overlay UI elements stored in overlay datastore 112-3 based at least partially on user context information (e.g., user context information 224), user profile information (e.g., user profile information 210), overlay promotion information (e.g., user promotion information 219). The suggestions may be provided in a list of aggregate overlay information (e.g., list of aggregate overlay information 230).

The social networking messaging component 110-4 may be generally arranged to provide messaging services to one or more users of the social networking system 101. Moreover, the network messaging component 110-3 may be arranged to receive one or more social messages from users utilizing one or more applications 124-a-1 and/or 124-a-2 of one or more devices 102-a. The network messaging component 110-3 may be arranged to transmit one or more received social messages to the respective users via one or more applications 124-a-1 and/or 124-a-2 of one or more devices 102-a. Additionally, the social networking messaging component 110-4 may also be arranged to store the received and/or transmitted messages between and among users in a messages datastore 112-1. It may be appreciated that the one or more social messages may include, but is not limited, to one or more multi-media social messages which may include, but is not limited to, images, video, illustrated graphical UI elements (e.g., "Stickers", etc.), and/or shareable composite images and/or video further discussed below and/or elsewhere.

The social networking communications component 110-2 may be generally arranged to provide communications for the one or more social networking components 110-c and communicate (e.g., transmit and/or receive information such as information 192, etc.) with the one or more applications 124-a-1 and/or 124-a-2 via communications network 103.

FIG. 1B illustrates an exemplary embodiment of a device 102-1, which may be a mobile device 102-1 (e.g., a mobile phone or any other a portable computing and/or communications device), comprising one or more applications 124-1-b, in the mobile predictive power management system 100. The mobile device 102-1 may be generally arranged to provide mobile computing and/or mobile communications and may include, but is not limited to, system memory 120, processing component 126, storage component 150, image capture component 154, communications component 158, acoustic input/output component 162, touch sensitive display component 182, haptic component 172, location component 172, acceleration component 180 and input/output component 184, where each of the components and system memory 120 may be operatively connected via interconnect 130.

In some embodiments, the processor component 126 may be generally arranged to execute instruction information including one or more instructions. In some embodiments, the processor component 126 may be a mobile processor component or system-on-chip (SoC) processor component which may comprise, among other elements, processor circuit 128. The processor circuit 128 may include, but is not limited to, a central processor unit (CPU) comprising a first set of electronic circuits arranged to execute one or more instructions and/or a graphics processing unit (GPU) comprising a second set of electronic circuits arranged to execute one or more graphics-oriented instructions. Exemplary processor components 126 may include, but is not limited to, Qualcomm® Snapdragon®, Nvidia® Tegra®, Intel® Atom®, Samsung® Exynos, Apple® A7®, Apple® A8®, or any other type of mobile processing component 126 arranged to execute the instruction information including the one or more instructions stored in system memory 120 and/or storage component 150.

In some embodiments, the storage component 150 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In some embodiments, the image capture component 154 may be generally arranged to capture one or more images or a sequence of one or more images (e.g., video, etc.) and provide image information and/or video information. The image capture component 154 may include, among other elements, image sensor(s) 156. Exemplary image sensors(s) 156 may include, but is not limited to, charged-coupled devices (CCD), active-pixel sensors (APS), or any other type of image sensors arranged for converting optical images into electronic signals that may be compressed, encoded, and/or stored as image information and/or video information. It may be appreciated that while not illustrated, in some embodiments, the image sensor(s) 156 may be positioned to enable a user to view the image information and/or video information visually presented on the display device 168 and captured by the image sensor(s) 156 substantially in real time, so that the user may easily capture, for example, a self-portrait utilizing the image sensor(s) 156. For example, the image sensor(s) 156 may be physically positioned or placed on the same plane as the display device 168 of the touch sensitive display component 182 and may be physically arranged to face a user using the mobile device 102-1. This may enable the image sensor(s) 156 to capture and convert at least optical images that are substantially perpendicular to the same plane as the display device 168. Additionally or alternatively, the mobile device 102-1 may further include, but is not limited to, additional image sensors positioned in other physical locations of the mobile device 102-1, which may enable the mobile device 102-1 to be used as a traditional digital camera.

In some embodiments, the communications component 158 may be generally arranged to enable the mobile device 102-1 to communicate with the social networking system 101 via the communication network 103. The communications component 158 may include, among other elements, a radio frequency circuit 160 configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), etc.).

In some embodiments, the acoustic input/output (I/O) component 162 may be generally arranged for converting sound, vibrations, or any other mechanical waves received into electronic signals representative of acoustic input information utilizing an acoustic sensor 164 (e.g., a microphone, etc.). Additionally, the acoustic I/O component 162 may be further arranged to convert electronic signals representative of acoustic output information utilizing an electroacoustic transducer 166 (e.g., a speaker, etc.) to output sound, vibrations, or any other mechanical waves.

In some embodiments, the touch sensitive display component 182 may be generally arranged to receive and present visual display information, and provide touch input information based on detected touch based or contact based input. Moreover, the touch sensitive display component 182 may include, among other elements, a display device 168 (e.g., liquid-crystal display, light-emitting diode display, organic light-emitting diode display, etc.) for presenting the visual display information and touch sensor 170 (e.g., resistive touch sensor, capacitive touch sensor, etc.) associated with the display device 168 to detect and/or receive touch or contact based input information via associated with the display device 168. Additionally, in some embodiments, the touch sensor 170 may be integrated with the surface of the display device 168, so that a user's touch or contact input may substantially correspond to the presented visual display information on the display device 168.

In some embodiments, the haptic component 172 may be generally arranged to provide tactile feedback through the housing, case, or enclosure of the mobile device 102-1. Moreover, the haptic component 172 may include, among other elements, a vibration circuit 174 (e.g., an oscillating motor, vibrating motor, etc.) arranged to convert haptic information to mechanical vibrations representative of tactile feedback.

In some embodiments, the location component 176 may be generally arranged to receive positioning signals representative of positioning information and provide location information (e.g., approximate physical location of the current mobile device 102-1) based at least partially on the received positioning information. Moreover, the location component 176 may include, among other elements, a positioning circuit 178 (e.g., a global positioning system (GPS) receiver, etc.) arranged to determine the physical location of the mobile device 102-1. In some embodiments, the location component 176 may be further arranged to communicate and/or interface with the communications component 158 and communicate with the communications network 103 in order to provide greater accuracy and/or faster location acquisition of the location information.

In some embodiments, the acceleration component 180 may be generally arranged to detect acceleration of the mobile device 102-1 in one or more axes. The acceleration component 180 may include, among other elements, motion sensor 182 (e.g., accelerometer, etc.) to convert physical motions applied the mobile device 102-1 into motion information.

In some embodiments, the input/output component 184 may be generally arranged to provide signal I/O and may include, among other elements, input/output circuit 186. Exemplary input/output components 184 may include, but is not limited to, microphone input component, headphone output component, universal serial bus (USB) component, or any other signal input/output component.

In some embodiments, the system memory 120 may be generally arranged to store information in volatile and/or nonvolatile high speed memory similar to those discussed with respect to storage component 150. In some embodiments, at least a portion of the stored information in the system memory 120 may comprise instruction information arranged for execution by the processing component 126. In those embodiments, the instruction information may be representative of at least one operating system 122-1, one or more applications 124-1-b, and/or any other programs and/or modules. In some embodiments, the one or more applications 124-1-b may include, but is not limited to, a management application 124-1-3 generally arranged to manage the execution of the one or more applications 124-1-b of the mobile device 102-1. The one or more applications 124-1-b may further include, but is not limited to, messaging application 124-1-1, social application 124-1-2, imaging application 124-1-4, phone application 124-1-5, calendar application 124-1-6, audio/video application 124-1-12, and/or any other application generally arranged for execution by the processing component 126.

In some embodiments, the operating system 122-1 may comprise a mobile operations system 122-1 (e.g., Apple®, iOS®, Google® Android®, HP® WebOS®, Microsoft® Windows Phone®, Microsoft® Windows®, etc.) general arranged to manage hardware resources (e.g., one or more components of the mobile device 102-1) and/or software resources (e.g., one or more applications 124-1-b of the mobile device 102-1). The operating system 122-1 may be further arranged to modify execution states associated with one or more applications 124-1-b based at least partially on information received from one or more components (e.g., touch sensitive display component 182, power source component (not shown), location component 176, communications component 158, etc.) and/or one or more applications (e.g., messaging application 124-1-1, social application 124-1-2, management application 124-1-3, imaging application 124-1-4, phone application 124-1-5, calendar application 124-1-6, etc.).

In some embodiments, the operating system 122-1 may be arranged to modify execution states by transitioning the one or more applications 124-1-b between and among the one or more execution states. The one or more execution states may include, but is not limited to, foreground state, non-execution state, suspended state, and/or background state. In some embodiments, applications 124-1-b may be initially in the non-execution state where the instruction information associated with applications 124-1-b in the non-execution state are not executed by the processor component 126 nor scheduled for execution by the processor component 126.

In some embodiments, the operating system 122-1 may transition an application (e.g., messaging application 124-1-1, etc.) may transition from the foreground state to the suspended state, in response to a request to launch a different application (e.g., transitioning the different application, such as, for example, social application 124-1-2 from non-execution state to the foreground state), switch to a different application (e.g., transitioning the different application, such as, for example, social application 124-1-2 from background state to the foreground state), or resume a different application (e.g., transitioning the different application, such as, for example, social application 124-1-2 from suspended state to the foreground state). In some embodiments, the operating system 122-1 may transition the application (e.g., social application 124-1-2, etc.) from the foreground state to the background state where a limited portion of the instruction information (e.g., instruction information associated with a background thread of the application, etc.) associated with the application is continued for further execution by the processor component 126 while the one or more UI views may not be visible or may be partially visible on the display device 168.

In some embodiments, the management application 124-1-3 may be visually presented as a home screen UI view (not shown) comprising a plurality of UI elements representative of applications 124-1-b and may be generally arranged to launch on startup of the mobile device 102-1 and operating system 122-1. Additionally, the management application 124-1-3 may be arranged to receive touch input information from the touch sensitive display component 182 in order to launch one or more applications 124-1-b. In some embodiments, the management application 124-1-3 may be arranged to request the operating system 122-1 to launch or initiate the execution of one or more applications 124-1-b of mobile device 102-1 based at least partially on the received input information (e.g., touch based input information received from touch sensor 170, etc.).

In some embodiments, the messaging application 124-1-1 may include, but is not limited to, an overlay component 190 and may be generally arranged to receive, transmit, display, and/or otherwise manage one or more messages including multimedia messages (e.g., pictures, videos, audio, etc.) utilizing one or more cellular and/or internet messaging services via one or more components of the mobile device 102-1. In some embodiments, the social application 124-1-2 may also include, but is not limited to, an overlay component 190 and may be generally arranged to provide social networking services between and among one or more users of one or more devices (e.g., Twitter®, Vine®, Facebook®, Reddit®, Digg®, Imgur®, etc.). In some embodiments, the imaging application 124-1-4 may be generally arranged to receive, store, display, and/or otherwise manage image information and/or video information received via the image capture component 154 and/or communications component 158 and/or stored in memory 120/ and/or storage component 150. Additionally, the imaging application 124-1-4 may be further arranged to record, playback, or output audio and/or video information received via communications component 158 and/or stored in memory 120 and/or storage component 150. In some embodiments, the phone application 124-1-5 may be generally arranged to receive, make, display, and/or otherwise manage one or more audio and/or video phone calls utilizing one or more cellular and/or internet phone services via one or more components of the mobile device 102-1 (e.g., acoustic input/output component 162, communications component 158, processing component 126, etc.). In some embodiments, the calendar application 124-1-6 may be generally arranged to store one or more appointments, meetings, and/or reminders, for a user of the mobile device 102-1.

Figure 1C:
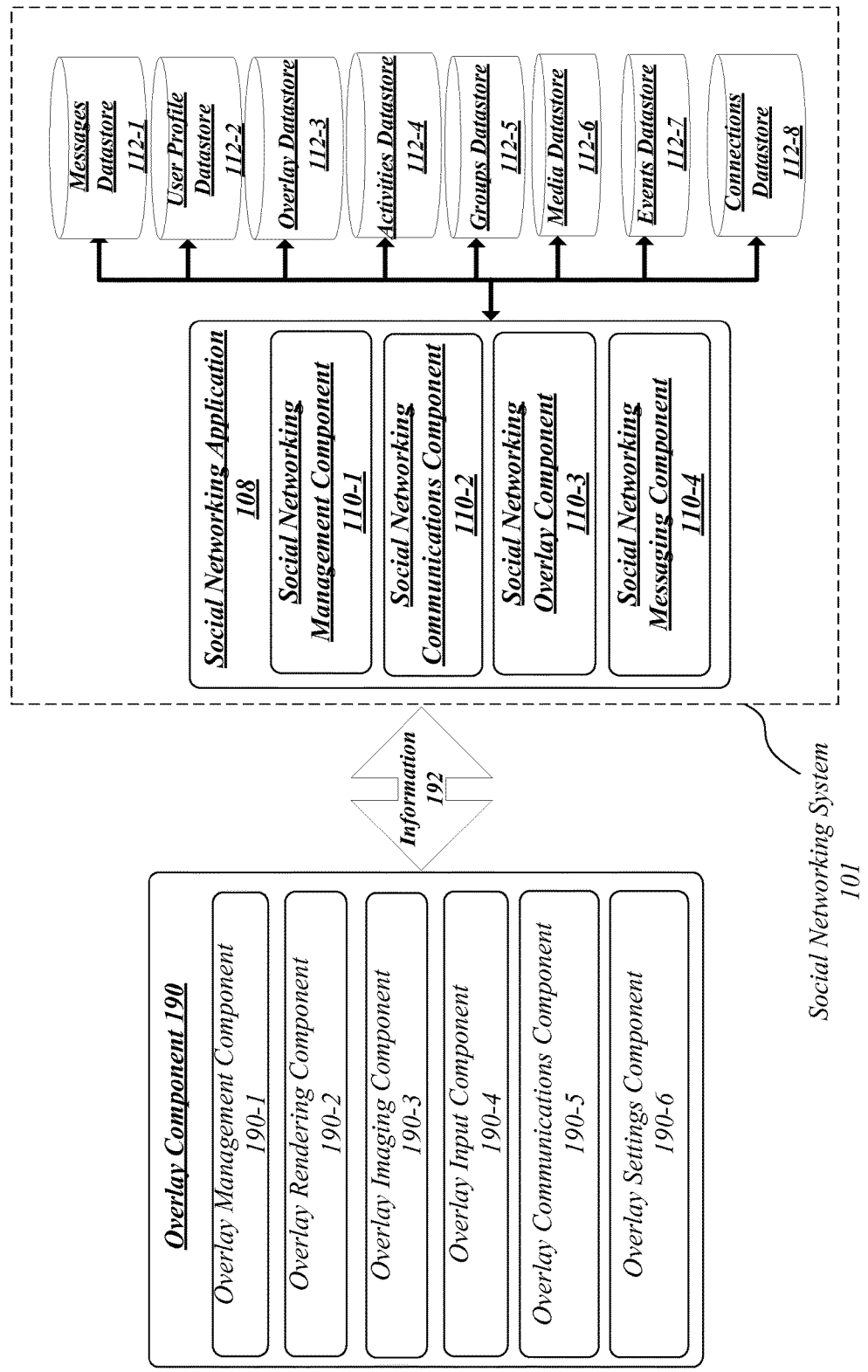
FIG. 1C illustrates an exemplary embodiment of the overlay component which may be operatively coupled to a social application and/or messaging application.

FIG. 1C illustrates an exemplary embodiment of the overlay component 190 for managing one or more overlay UI elements in one or more images and/or videos of a social application 124-1-2 and/or messaging application 124-1-1. It may be appreciated that, while not illustrated, the social application 124-1-2 and/or messaging application 124-1-1 may be generally arranged to authenticate a user having an associated user account in the social networking system 101 based on at least a portion of the user account information (e.g., user account identifier and user account authentication token) inputted by the user utilizing, for example, an on-screen virtual keyboard or any other input information. Moreover, once the user having the associated user account has been authenticated, the social application 124-1-2 and/or messaging application 124-1-1 may be configured to receive one or more time limited access tokens from the social networking application 108, and store the one or more time limited access tokens in the storage component 150 and/or system memory 120 of the mobile device 102-1 for use by the one or more components of the social application 124-1-2 and/or messaging application 124-1-1 (e.g., overlay component 190) to utilize one or more services provided by the social networking system 101 as a user having the associated user account information and/or user profile information. The overlay component 190 may further include one or more components, which may include, but is not limited to, overlay management component 190-1, overlay rendering component 190-2, overlay imaging component 190-3, overlay input component 190-4, and/or overlay communications component 190-5, and/or overlay settings component 190-6.

The overlay communications component 190-5 may be generally arranged to receive, transmit, and/or otherwise facilitate communications of information 192 between the one or more components of the overlay component 190, and the social networking system 101 utilizing the received, stored, and/or cached one or more time limited access tokens, one or more APIs (e.g., graph API, etc.), one or more components of the messaging application 124-1-1 and/or the social application 124-1-2, one or more components of the mobile device 102-1 (e.g., the communications component 158), and communications network 103.

The overlay rendering component 190-2 may be generally arranged to provide visual display information to the touch sensitive display component 182 and render one or more UI views comprising one or more UI elements, image information, and/or video information for visual presentation on the display device 168. In some embodiments, the overlay rendering component 190-2 may be further arranged to provide visual display information to the touch sensitive display component 182 to render one or more animated transitions between the one or more views and/or render one or more animated UI elements for visual presentation on the display device 168.

The overlay imaging component 190-3 may be generally arranged to receive image and/or video information received from image capture component 154 in substantially real time and/or stored in local image datastore (not shown) in the system memory 120 and/or storage component 150. Additionally, the overlay imaging component 190-3 may be generally arranged to provide the image and/or video information to the overlay rendering component 190-2 for rendering and visually presenting the image and/or video information on a display device 168 of the touch sensitive display component 182.

In some embodiments, the overlay imaging component 190-3 may be arranged to detect and track one or more features within the received image information and/or video information such as, for example, faces, eyes, nose, ear, persons, inanimate objects, facial expressions, eye blinks, and/or the like utilizing one or more image processing, image recognition, image detection, and/or a machine vision components, modules, and/or libraries (e.g., one or more modules or components of Apple® Core Image library, one or more modules of the Open Source Computer Vision (Open CV), etc.). The overlay imaging component may be further arranged to generate image recognition information in at least near real time and provide the generated image recognition information to one or more components of the overlay component 190. The image recognition information may include, but is not limited to, information representative of one or more identified features and the associated location and size of each identified feature.

The overlay input component 190-4 may be generally arranged to provide user input information which may include, but is not limited to, one or more gestures and provide character input information utilizing one or more components of the mobile device 102-1 (e.g., touch sensitive display component 182). In some embodiments, the overlay input component 190-4 may be configured to receive touch input information from the touch sensitive display component 182 and determine one or more finger gestures based at least partially on the received touch input information. In some embodiments, the overlay input component 190-4 may be configured to provide user input information including the character input information to the based on one or more characters inputted by a user utilizing an on-screen virtual keyboard (not shown) visually presented on at least a portion of the display device 168. Moreover, the character input information may be determined based at least partially on one or more contacts detected in a predefined region associated with the on-screen virtual keyboard.

In some embodiments, the overlay input component 190-4 may be further configured to detect a selection finger gesture to select a selectable UI element based at least partially on the received touch input information, the received touched input information may include, but is not limited to, finger contact at a first location in a predefined region associated with the UI element visually presented on the display device 168 (e.g., display screen 310 of display device 168) for a predefined time period (e.g., less than one second), and termination of the finger contact at the first location of the predefined region.

In some embodiments, the overlay input component 190-4 may be also configured to detect a scroll finger gesture to scroll a scrollable UI element and/or scrollable UI view based at least partially on the received touch input information, the received touched input information may include, but is not limited to, finger contact at a first location in a predefined region associated with the scrollable UI element and/or scrollable UI view visually presented on the display device 168 (e.g., display screen 310 of display device 168), initiating movement of the finger contact within a predefined time period after the finger contact (e.g., less than one second), continuous movement of the finger contact from the first location to a second location in at least one direction (e.g., up direction, down direction, left direction, right direction, or any combination thereof), and termination of the finger contact at the second location.

In some embodiments, the overlay input component 190-4 may be further configured to detect a movement finger gesture to move a moveable UI element from a first position to a second position on the display device 168 (e.g., display screen 310 of display device 168) based at least partially on the received touch input information. Furthermore, detecting the movement finger gesture may include, but is not limited to detecting a starting movement finger gesture to begin the movement of a moveable UI element and an ending movement finger gesture to end the movement of the moveable UI element.

In some embodiments, the overlay input component 190-4 may be configured to detect the starting movement finger gesture based on the received touch input information which may include, but is not limited to, finger contact at the first location in a predefined region associated with the moveable UI element visually presented on the display device 168. The overlay input component 190-4 may be configured to detect the ending movement finger gesture based on the received touch input information which may include, but is not limited to, finger contact from the first location to the second location in one direction, and termination of the finger contact at the second location after movement of the finger contact.

In some embodiments, the overlay input component 190-4 may be further configured to detect an edit finger gesture to begin editing an editable UI element (e.g., modifying, color, shape, add text, remove text, add new features, etc.) based at least partially on the received touch input information. Furthermore, detecting the edit finger gesture finger gesture which may include, but is not limited to, finger contact at a location in a predefined region associated with the editable UI element visually presented on the display device 168 for a predefined time period (e.g., two seconds, three seconds, etc.) and detecting termination of the contact at the location after the predefined time period.

It may be appreciated that in some embodiments, UI elements and/or UI views may be configured as selectable, moveable, editable, and/or scrollable, and the overlay input component 190-4 may be configured to determine the respective finger gesture based at least partially on the received touch input information.

The overlay settings component 190-6 may be generally arranged to manage the settings associated with the overlay component 190 and/or social networking overlay component 110-3. In some embodiments, the overlay settings component 190-6 may be configured to modify and/or update user overlay preferences information stored or cached in storage component 150 and/or system memory 120, based at least partially on user input information provided by the discussions input component 190-4.

In some embodiments, the overlay settings component 190-6 may be configured to modify, update, and/or otherwise synchronize the user mobile discussions application preferences information stored or cached in storage component 150 and/or system memory 120 with the user mobile discussions application preferences information stored in the social networking system 101, so that any instance of the messaging applications 124-*a*-1 and/or social applications 124-*a*-2 including the overlay component 190 for a user having an associated user account and user profile information may share and/or utilize the latest user overlay preferences information regardless of which device the user is currently using.

The overlay management component 190-1 be generally arranged to provide context sensitive overlay management for the messaging application 124-1-1 and/or social application 124-1-2. To provide context sensitive overlay management, the overlay management component 190-1 may be generally arranged to manage the capture of image and/or video information that includes one or more context overlay UI elements, i.e., one or more composite overlay images or videos utilizing one or more components of the overlay component 190. The one or more composite overlay images may then be shared with one or more users (e.g., shared as one or more social messages, profile activities, etc.) via the social networking system 101.

In some embodiments, the overlay management component 190-1 may be configured to receive a request from the one or more components of the messaging application 124-1-1 and/or social application 124-1-2 to visually present an image/video share UI view (e.g., image/video share UI view 300, etc.) for sharing image information and/or video information received from image capture component 154. In response to the request for sharing image information and/or video information received from image capture component 154, the overlay management component 190-1 may configure the overlay rendering component 190-2 to render and visually present the image/video share UI view (e.g., image/video share UI view 300 of FIG. 3) based at least partially on image information and/or video information received from the image capture component 154.

Additionally or alternatively, the overlay management component 190-1 may also be configured to receive a request from the one or more components of the messaging application 124-1-1 and/or social application 124-1-2 to visually present an image/video share UI view (e.g., image/video share UI view 300, etc.) for sharing image information and/or video information stored in a image datastore (not shown) of the system memory 120 and/or storage component 150 of the mobile device 102-1. In response to a request to share image information and/or video information stored in a image datastore (not shown) of the system memory 120 and/or storage component 150, the overlay management component 190-1 may configure the overlay rendering component 190-2 to render and visually present an image/video share UI view (e.g., image/video share UI view 300, etc.) based at least partially on image information and/or video information stored in an image datastore (not shown) of the system memory 120 and/or storage component 150.

To provide users with a preview of overlay UI elements applicable to a user's context, in some embodiments, the overlay management component 190-1, may be configured to receive a request to preview one or more composite overlay UI views in a composite overlay preview UI view (e.g., composite overlay preview UI view 400 of FIG. 4), which may include, but is not limited to, a grid (e.g., a three by three grid, etc.) of composite overlay UI elements. Each composite overlay UI element may be configured to visually present a particular composite overlay UI view (e.g., composite overlay UI view 500, 520, 540, 560, etc.). A composite overlay UI view may be represented by an associated composite overlay view information and may include, but is not limited to, the image and/or video represented by the image and/or video information and at least one overlay UI element for rendering and/or visual presentation with the image and/or video (e.g., visual presentation on top of the image and/or video information).

Figure 2A:
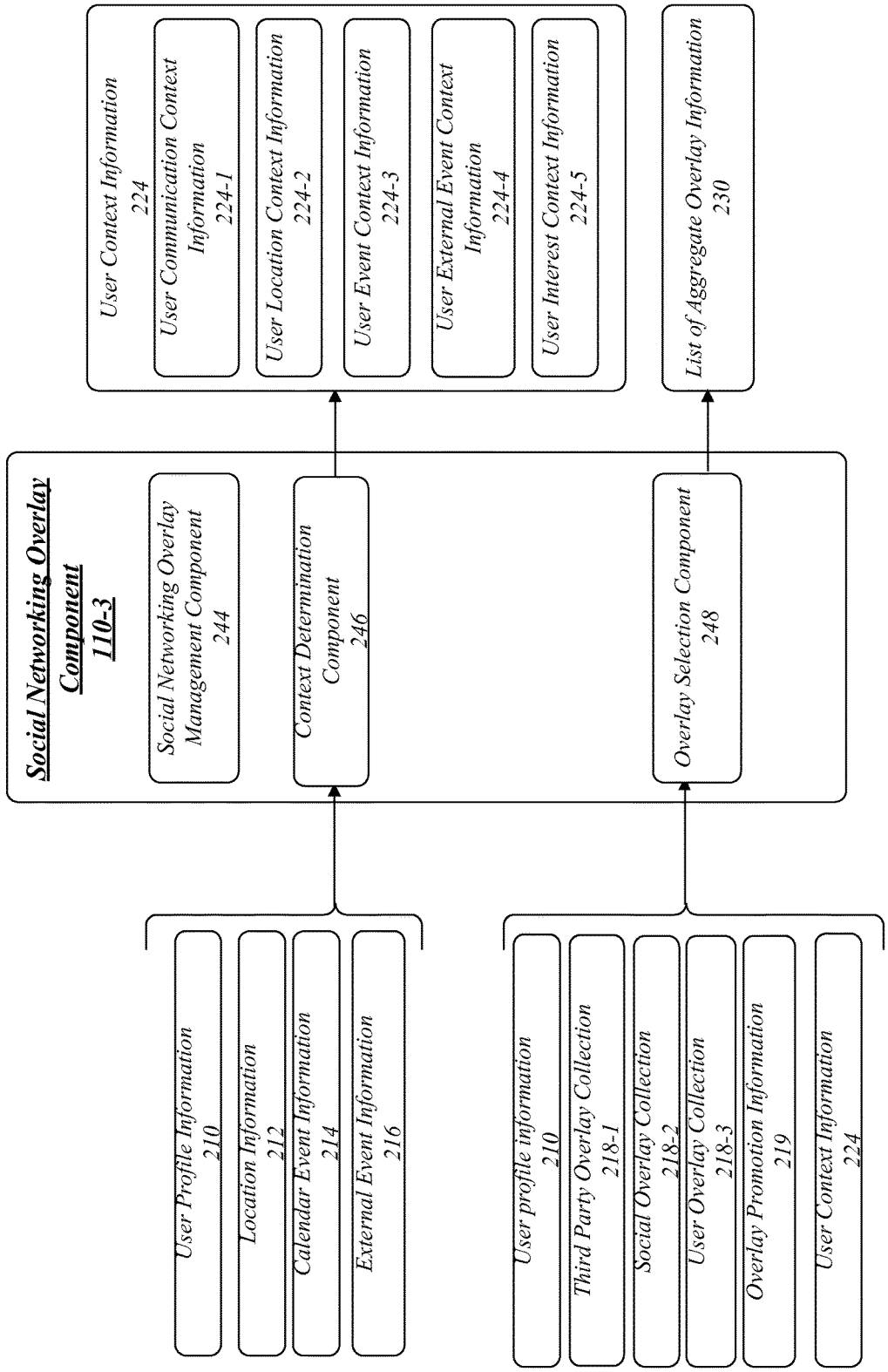
FIG. 2A illustrates an operating environment of a social networking overlay component.

In response to receiving the request to preview one or more overlay UI elements, the overlay management component 190-1 may be configured to request the social networking overlay component 110-3 for a list of aggregate overlay information by generating a request for the list of aggregate overlay information, where each aggregate overlay information may include at least one overlay element identifier that identifies at least one overlay UI element, where the at least one overlay UI element may be applicable to a user's context as represented by the user context information (e.g., user context information 224 further discussed in FIG. 2A, etc.).

In some embodiments, the request may include, but is not limited to, location information (e.g., location information received from a location component 176) for identifying the current location (e.g., longitude, latitude, and/or altitude coordinates, etc.) of the mobile device 102-1 and/or calendar event information (e.g., one or more calendar events associated with calendar application 124-1-6) for identifying one or more calendar events stored on the mobile device 102-1. In response to the request, the overlay management component 190-1 may be configured to receive the list of aggregate overlay information and optionally, user context information, where each aggregate overlay information may include, but is not limited to, at least one overlay element identifier that may identify a particular overlay UI element represented as overlay element information stored in the overlay datastore 112-3. To ensure and respect a user's privacy, in some embodiments, the overlay management component 190-1 may be further configured to provide the location information and/or calendar event information, when the user overlay preferences information indicates that the user has authorized the mobile component 190 to provide the location information and/or calendar event information to the social networking system 101 for further analysis.

The overlay element information associated with an overlay UI element may include, but is not limited to, overlay element identifier information (e.g., an overlay element identifier that uniquely identifies a particular overlay UI element), overlay name information (e.g., the name of the overlay UI element), overlay attribute information (e.g., one or more attributes that may be modified by one or more user utilizing for example a mobile device), overlay commercialization information (e.g., cost associated with the overlay UI element, promotional information such as promotions and/or discounts in the form of discount barcodes associated with sharing the overlay UI element, etc.), overlay rendering information (e.g., the information for rendering the context sensitive overlay UI element for visual presentation on a display device), overlay feature alignment information (e.g., information for assisting in the positioning, orienting, and/or proportioning of detected features within images and/or videos), overlay source information (e.g., the affiliate, sponsor, associated entity, user, and/or source of the overlay UI element and/or the affiliate, sponsor, associated entity, user, and/or source that modified the overlay UI element), overlay set information (e.g., the one or more groups, sets, or packs that a particular overlay UI element is part of or belongs to), overlay popularity information (e.g., the number of times the overlay UI element has been shared between and among all users in the social networking system in one or more set time periods and the user identifier information that shared the overlay UI element in those set time periods), overlay multi-person information (e.g., indicates how many persons the overlay UI element is applicable), and/or overlay context information (e.g., one or more context terms for identifying the appropriate context associated with the overlay rendering information).

The overlay attribute information may include, but is not limited to, overlay position information (e.g., the position overlay position for rendering and visual presentation on a display device), overlay size information (e.g., the size of the overlay UI element), overlay text information (e.g., associated text, position of the text, size of the text, font of the text for the overlay UI element), overlay color information (e.g., associated color(s) for the overlay UI element), overlay illustrated graphical UI elements information (e.g., additional graphical elements such as "Stickers"), overlay orientation information (e.g., the rotation of the overlay UI element), and/or overlay customized graphics information (e.g., any additional drawings, sketching, and/or coloring associated with the overlay UI element).

To render and visually present a composite overlay preview UI view (e.g., the composite overlay preview UI view 400) including one or more composite overlay UI elements, the overlay management component 190-1 may be further configured to request and receive overlay element information for each overlay UI element identified by the overlay element identifier in one or more aggregate overlay information. Moreover, the overlay management component 190-1 may be configured to request and receive overlay element information from the social networking overlay component 110-3 for overlay element information representative of one or more overlay UI elements not already located in a local overlay datastore (not shown) in the system memory 120 and/or storage component 150 of the mobile device 102-1. After a sufficient number of overlay element information has been requested and received (e.g., sufficient number of overlay element information to render a composite overlay preview UI view such as a list of aggregate overlay information to render 9 composite overlay UI elements 410-*m-n*, etc.), the overlay management component 190-1 may configure the overlay rendering component 190-2 to render and visually present one or more composite overlay UI elements (e.g., composite overlay UI element 410-1-1, etc.). Each composite overlay UI element may be configured to visually present a preview of at least one overlay UI element as rendered with received and/or stored image information and/or video information.

To ensure that at least one overlay UI element in a composite overlay UI element is properly positioned, oriented, and/or proportioned with respect to the features within images and/or videos, in some embodiments, at least one overlay UI element may also be rendered and visually presented based at least partially on the image recognition information and overlay feature alignment information associated with each overlay UI element. Moreover, in those embodiments, the overlay management component 190-1 may be configured to generate modified overlay element information by modifying one or more attributes of the overlay UI element (e.g., modifying the overlay position information, overlay size information, overlay orientation information of overlay element information associated with the UI element, etc.) to align, orient, and/or proportion to a particular feature or features as indicated in the overlay feature alignment information (e.g., align adjacent to a top edge of a detected feature such as a head, on top of an detected feature such as eyes, below a detected feature such as a face, overlapping a detected feature such as nose, etc.) to features detected in the image recognition information (e.g., eyes, face, mouth, head, etc.), so that the rendered and visually presented overlay UI element in a composite overlay UI element may be substantially positioned and proportioned at least near one or more features detected in the background images and/or background videos represented by image and/or video information. In those embodiments, the overlay management component 190-1 may configure the modified overlay information to render and visually present the overlay UI element having one or more modified attributes in one or more UI views (e.g., composite overlay UI element 410-1-1 in the composite overlay preview UI view 400, etc.) based at least partially on image recognition modified overlay element information.

In a non-limiting example, the overlay management component 190-1 may generate modified overlay element information by modifying the overlay position information, overlay orientation information, and/or overlay size information of an overlay UI element representative of eye lashes to align, orient, and/or proportion the overlay UI element as adjacent to a top edge of a pair of eyes detected in the image and/or video, so that the overlay UI element is rendered and visually presented substantially near or adjacent to the eyes of a face and has a size that is in proportion to the eyes of the face detected in the image and/or video (e.g., the image and/or video represented by image information and/or video information received via the image capture component 154 and/or communications component 158 and/or stored in memory 120/ and/or storage component 150). It may be appreciated that the overlay management component 190-1 may modify one or more attributes of an overlay UI element in near real time as the image recognition information is also generated and/or updated in near real time, so that the overlay management component 190-1 may configure the overlay rendering component 190-2 to render the overlay UI element in near real time and substantially track or follow the position, orientation, and/or proportion of one or more detected features.

To provide users with a more detailed view of overlay UI elements, add additional overlay UI elements, and/or modify overlay UI elements, in some embodiments, the overlay management component 190-1 may be configured to render and visually present one or more composite overlay UI views (e.g. composite overlay UI views 500, 520, 540, 560, etc.) including one or more overlay UI elements, in response to receiving a request to render and visually present a particular composite overlay UI view.

In some embodiments, the overlay management component 190-1 may be configured to render and/or visually present one or more overlay UI elements in a composite overlay UI view based at partially on the overlay element information representative of an overlay UI element in a composite overlay UI view. In those embodiments, the overlay management component 190-1 may be further configured to render and visually present one or more overlay UI element for the composite overlay UI view based at least partially on one or more attributes of the one or more overlay UI elements.

To ensure that at least one overlay UI element in a composite overlay UI view is properly positioned and proportioned with respect to the features within images and/or videos, the overlay management component 190-1 may be configured to modify one or more attributes of the overlay UI element (e.g., overlay position information, overlay size information, overlay orientation information, etc.) to align, orient, and/or proportion to a particular feature or features as indicated in the overlay feature alignment information to features detected in the image recognition information as discussed above and/or elsewhere.

In some embodiments, at least one overlay UI element may be substantially rendered and visually presented based at least partially on the received user context information (e.g., user context information 224 further discussed in FIG. 2A) representative of one or more contexts of a user. In those embodiments, the overlay management component 190-1 may also be configured to modify one or more attributes of the overlay UI element (e.g., modifying overlay text information associated with the overlay UI element), so that the overlay UI element may be rendered and visually presented with modified attributes appropriate for a particular user context based at partially on the user context information.

In one non-limiting example, the overlay management component 190-1 may modify the overlay text information of an overlay UI element representative of word or conversation bubble with associated text stating "I Love You!", when the overlay management component 190-1 determines that the user is messaging their spouse based at partially on user context information (e.g., user communications context information 224-1).

In another example, the overlay management component 190-1 may modify the overlay text information of an overlay UI element representative of word or speech bubble to with text stating "On my way", when the overlay management component 190-1 determines that the user is late for an event based at least partially on the user context information (e.g., user location context information 224-2, user event context information 224-3, etc.). Moreover, to determine that the user is late for the event, the overlay management component 190-1 may correlate the user location context information 224-2, which may identify one or more approximate locations for a mobile device (e.g., mobile device 102-1) associated with the user with user event context information 224-3, which may identify at least one user event context which may include one or more current events that the user intends to participate, the location of that event and/or the number of users who are socially connected to the user that are also intending to participate or is currently participating.

In still another non-limiting example, the overlay management component 190-1 may modify the overlay size information and/or overlay color information of an overlay UI element representative of a birthday cake to increase the size of the birthday cake and/or at least some of the associated colors of the birthday cake, when the overlay management component 190-1 determines that the user is at a location associated with a birthday party event with ten or more of their friends who are also at the location associated with the birthday party event based at least partially on the user context information (e.g., user event context information 224-3 discussed above and/or elsewhere, etc.).

In some embodiments, the one or more overlay UI elements in one or more composite overlay UI views may be freely available to a user for sharing via messaging application 124-1-1 and/or social application 124-1-2 as indicated by the associated overlay commercialization information. In other embodiments, the one or more overlay UI elements in one or more composite overlay UI views may have a cost or price associated with an overlay UI element for purchase by a user as indicated by the associated overlay commercialization information. It may be appreciated that the users may purchase the one or more overlay UI elements via the messaging application 124-1-1 and/or social application 124-1-2 in one or more UI views (not shown) of the messaging application 124-1-1 and/or social application 124-1-2 and/or as rendered and visually presented in composite overlay UI views (e.g., composite overlay UI views 500, 520, 540, 560, etc.). Additionally or alternatively, the messaging application 124-1-1 and/or social application 124-1-2 may also enable users to purchase one or more overlay UI elements in one or more packs, groups, or sets where each packs, groups, or set may include one or more overlay UI elements.

In some embodiments, the overlay management component 190-1 may be configured to enable a user to modify one or more overlay attributes of one or more overlay UI element (e.g., modifying positioning information, overlay size information, overlay text information, overlay color information, illustrated graphical UI elements information, overlay customized graphics information, etc.), in response to a request to begin modifying one or more overlay attributes associated with an overlay UI element in one or more UI views (e.g., composite overlay UI view 500, 520, 540, 560, etc.). The modifiable overlay attribute information may include, but is not limited to, overlay position information (e.g., the position overlay position for rendering and visual presentation on a display device), overlay size information (e.g., the size of the overlay element), overlay text information (e.g., associated text for the overlay element), overlay color information (e.g., associated color(s) for the overlay UI element), illustrated graphical UI elements information (e.g., additional illustrated graphical UI elements such as "Stickers"), overlay orientation information (e.g., the rotation of the overlay UI element), and/or overlay customized graphics information (e.g., any additional drawings, sketching, and/or coloring associated with the overlay UI element). This may enable users to add associated text, add associated illustrated graphical UI elements such as "stickers", modify associated color, modify position, modify orientation, modify proportion, associated with one or more overlay UI elements.

In some embodiments, the overlay management component 190-1 may be configured to enable a user create their own overlay UI element, in response to a request to create an overlay UI element. The overlay management component 190-1 may enable a user to create their own overlay UI element by adding an existing image and/or animated image (e.g., animated gif, etc.) stored in the local image datastore (not shown) of the mobile device 102-1 as a user overlay UI element having an associated overlay element information. Additionally or alternatively, the overlay management component 190-1 may also be configured to enable a user create their own user overlay UI element by utilizing one or more UI views (not shown) configured to enable drawing, coloring, and/or sketching of one or more overlay UI elements utilizing one or more finger gestures on a display screen (e.g., display screen 310 illustrated in FIGS. 3, 4, 5A-5D, etc.) the touch sensitive display component 182.

Similarly, in some embodiments, the overlay management component 190-1 may also be configured to enable a user to modify existing overlay UI element utilizing one or more UI views (not shown) configured to enable drawing, coloring, and/or sketching of one or more overlay UI elements utilizing one or more finger gestures on the touch sensitive display component 182. It may be appreciated that the additional drawings, coloring, and/or sketching may be stored as overlay customized graphics information associated with each overlay UI element.

To ensure that newly created overlay UI elements may be appropriately presented in the future for user contexts identified in user context information (e.g., user context information 224), in some embodiments, the overlay management component 190-1 may be further configured to visually present one or more UI views (not shown) configured to request and receive at least a portion of the overlay element information (e.g., overlay name information, overlay context information, etc.) associated with the new user overlay UI element utilizing, for example, an on-screen virtual keyboard or any other input information received from the user.

In some embodiments, the overlay management component 190-1 may also be configured to enable a user to add additional overlay UI elements (e.g., overlay UI element 254-1, overlay UI element 254-5, etc.) in one or more UI views such as, for example, image/video share UI view 300 and/or composite overlay UI views 500, 520, 540, 560, in response to an add overlay UI element request. To enable users to select additional overlay UI elements to add to the one or more UI views and provide a preview of the visual presentation of the one or more overlay UI elements as applied to a background image and/or video (e.g., background image and/or video represented by image information and/or video information captured from image capture component 154, etc.), the overlay management component 190-1 may visually present composite overlay preview UI view 400, which may include, but is not limited to, one or more composite overlay UI elements 410-*m*-*n* where each composite overlay UI elements may include, but is not limited to, the background image and/or video and/or at least one overlay UI element (e.g., overlay UI element 254-8 as illustrated in composite overlay preview UI view 400 of FIG. 4.

In addition to adding new and/or existing overlay UI elements, the overlay UI elements may also be configured to enable a user to add additional images to an image/video share UI view (e.g., image/video share UI view 300) and/or composite overlay UI view (e.g., composite overlay UI view 500), in response to an add image request. Moreover, the additional images may include, but is not limited to, images represented by an associated image information stored in a local image datastore (not shown) on the mobile device 102-1 and/or image information stored in the media datastore 112-6 associated with the user profile information of the user. This may enable the user to add an image of their friends, family, significant other, and/or the like to an existing composite overlay UI view, which may include overlay UI elements appropriate for two or more persons. It may be appreciated the added image may be appropriately positioned, oriented, and/or proportioned utilizing for example one or more gestures to ensure that the newly added image of appropriate size, position, and/or orientation with respect to the existing images and/or video.

After a user is a satisfied with one or more overlay UI elements visually presented in one or more composite overlay UI views, the user may request the overlay management component 190-1 to share a composite overlay image or composite overlay video, which may include, but is not limited to, the one or more overlay UI elements, and the background image and/or video visually presented by the composite overlay UI view including any modifications by the user (e.g., modifications including additional drawing, coloring, texts associated with one or more overlay UI elements etc.) and/or by the overlay management component 190-1 (e.g., modifications of the one or more overlay UI elements as result of image recognition and feature detection, etc.). In response to the request to share, the overlay management component 190-1 may modify overlay source information for any newly created or customized overlay UI elements to indicate a corresponding newly created or customized overlay UI element is user created or user customized. Additionally, the overlay management component 190-1 may transmit the overlay element information for any user created or user customized overlay UI elements to the social networking overlay component 110-3 for storage in the overlay datastore 112-3.

The overlay management component 190-1 may be further configured to generate a shareable composite overlay information which may include, but is not limited to, a rendered image information or rendered video information including the one or more overlay UI elements and the background image or video including any modifications by the user and/or by the overlay management component 190-1. Additionally, the shareable composite overlay information may further include a list of overlay element identifiers associated with the one or more overlay UI elements in the shareable composite overlay image or shareable composite overlay video represented by the shareable composite overlay information.

After the shareable composite overlay information is generated, the messaging application 124-1-1 and/or social application 124-1-2 may be configured to transmit the shareable composite overlay information to one or more users having associated user account information as one or more social messages and/or one or more profile activities (e.g., posts, etc.) via the social networking system 101.

In some embodiments, the messaging application 124-1-1 and/or social application 124-1-2 may also be configured to receive shareable composite overlay information representative of one or more composite overlay images generated and transmitted by other users utilizing one or more devices (e.g., mobile device 102-2, etc.) via social networking system 101 as one or more social messages and/or one or more profile activities. In those embodiments, the received shareable composite overlay information from other users in the social networking system 101 may be further rendered and visually presented by the messaging application 124-1-1 and/or social application 124-1-2 on a display screen (e.g., display screen 310 of FIG. 3, 4, 5A-5D, etc.) of the display device 168 of the touch sensitive display component 182.

In some embodiments, after shareable composite overlay information representative of an overlay image is shared with one or more other users (e.g., shared utilizing one or more social messages, one or more profile activities, etc.) via the social networking system 101, the social networking overlay component 110-3 may be configured to provide the recipient user with access to one or more overlay UI elements included within the shareable composite overlay information based at least partially on the list of overlay element identifiers included in the shareable composite overlay information and overlay commercialization information associated with each overlay UI element identified by the list of overlay element identifiers.

In those embodiments, the social networking overlay component 110-3 may be configured to provide access by updating the user overlay ownership information associated with the recipient user's user profile information. Additionally or alternatively, individual overlay UI elements may also be shared without the accompanying rendered image information and/or rendered video information for future use by utilizing, for example, one or more social messages including the associated overlay element identifier to one or more users. However, it may be appreciated that an overlay UI element having an associated price for purchase as indicated overlay commercialization information associated with that overlay UI element may not be provided for sharing without first being purchased by the recipient user.

FIG. 2A illustrates an operating environment of a social networking overlay component. As illustrated in FIG. 2A, the operating environment 200 may include, but is not limited to the social networking overlay component 110-3. The social networking overlay component 110-3 may include, but is not limited to, social networking overlay management component 244, context determination component 246, and/or overlay selection component 248.

In some embodiments, social networking overlay management component 244 may be configured to manage access to overlay element information for one or more users based at least partially on one or more purchases and/or requests to access one or more overlay UI elements and/or one or more overlay UI elements shared with a user. Moreover, the social networking overlay management component 244 may be configured to receive a request from an overlay component 190 of a messaging application 124-1-1 and/or social application 124-1-2 for overlay element information representative of one or more overlay UI elements based at least partially on overlay element identifier information, retrieve the requested overlay element information from the overlay datastore 112-3, and provide the retrieved overlay element information to the overlay component 190 of a messaging application 124-1-1 and/or social application 124-1-2.

In some embodiments, the social networking overlay management component 244 may also be optionally configured to analyze one or more social messages stored in the messages datastore 112-1 and/or one or more profile actives storied in activities datastore 112-3 to determine user overlay usage information 222 for each user and overlay popularity information for each overlay UI element. To ensure and respect a user's privacy, in some embodiments, the social networking overlay management component 244 may be configured to analyze one or more profile actives storied in activities datastore 112-3, when the user overlay preferences information indicates that the user has authorized the social networking system 101 to analyze one or more social messages and/or one or more profile activities of a user.

In some embodiments, including, but is not limited to, embodiments where one or more overlay UI elements may be sponsored, the social networking overlay management component 244 may be configured to provide promotional information (e.g., provide promotional information via e-mail, social messages, profile activities, etc.) which may include, promotions and/or discounts in the form of promotion codes and/or discount codes (e.g., discount barcodes such as QR codes, alphanumeric values, etc.) to one or more users, based at least partially on overlay commercialization information associated with each overlay UI element. Moreover, the overlay commercialization information may indicate that a user sharing the associated overlay UI element with one or more recipient users and/or the one or more recipient users receiving the associated overlay UI element may receive promotions and/or discounts as indicated in the overlay commercialization information for that overlay UI element.

In those embodiments, the social networking overlay management component 244 may be configured to provide the promotional information associated with an overlay UI element to a user and/or one or more recipient users, when the user shares the overlay UI element (e.g., sharing a shareable composite overlay image and/or video including the overlay UI element, sharing the overlay UI element by itself, etc.) with the one or more recipient users via one or more social messages and/or profile activities. It may be appreciated that the user sharing the overlay UI element and/or the one or more recipient users may receive the same promotional information or different promotional information based on the commercialization information associated with each overlay UI element. This may empower users to share one or more overlay UI elements and obtain ownership with the one or more overlay UI elements shared with them while receiving discounts and/or promotions associated with sharing overlay UI elements.

In some embodiments, the social networking overlay management component 244 may be configured to receive overlay element information for any user created or user customized overlay UI elements, and store the received overlay element information representative of overlay UI elements created by a user or customized by a user in the overlay datastore 112-3.

In some embodiments, social networking overlay management component 244 may also be configured to request the determination of a user context information 224 and/or a list of aggregate overlay information 230 by the context determination component 246 and the overlay selection component 248 for a user having an associated user profile information 210, in response to receiving a request from an overlay component 190 of a messaging application 124-1-1 and/or social application 124-1-2 for the user context information 224 and list of aggregate overlay information 230. The social networking overlay management component 244 may also be configured to provide the user context information 224 and/or the list of aggregate overlay information 230 to the user having the associated user profile information 210.

In some embodiments, the context determination component 246 may be configured to determine user context information 224 for a particular user based at least partially on user profile information 210 (e.g., user interest information, user group membership information, user social messages information, user biographic and/or demographic information, user event information, user search information, etc.), location information 212, and/or any other information associated with a user's presence within the social networking system 101.

The user context information 224 may include, but is not limited to, at least one user context represented by user communication context information 224-1, user location context information 224-2, user event context information 224-3, user external event context information 224-4, user interest context information 224-5, and/or any other user context information that may be determined based at least partially on a user's presence within the social networking system 101.

In some embodiments, the user location context information 224-2 may identify at least one user location context, which may include, but is not limited to, one or more approximate locations (e.g., one or more points of interests within a circular shaped geo-fence having a specific radius such as 100 feet, 500 feet, 1000 feet, etc.) for a device (e.g., mobile device 102-1, etc.) associated with a user. The context determination component 246 may be configured to determine the user location context information 224-2 based at least partially on location information 212, user profile information 210 (e.g., user biographic and/or demographic information, user event information, etc.), and/or calendar event information 214. In one non-limiting example, user location context information 224-2 may indicate that a user is currently located at a "McDonald's" with an associated address of "1060 N. Rengstorff Ave., Mountain View, CA 94043." In another non-limiting example, the user location context information 224-2 may indicate the user is currently located at "Home" with an associated address or at "Work" with an associated address based at least partially on user profile information (e.g., user biographic and/or demographic information, etc.) and location information 212. In yet another non-limiting example, user location context information 224-2 may indicate that the user may be currently at a "Birthday Party Event" with an associated address based at least partially on location information 212, user profile information, and/or calendar event information 214.

In some embodiments, the user event context information 224-3 may identify at least one user event context which may include, but is not limited to, one or more current events that the user intends to participate, the location of that event, and the number of users who are socially connected to the user that are also intending to participate or is currently participating. The context determination component 246 may be configured to determine the user event context information 224-3 based at least partially on calendar event information 214, location information 212, and/or user profile information 210 (e.g., user event information, user social connections information, etc.) associated with one or more users. In one non-limiting example, the user event context information 224-3 may indicate that the user intends to attend a "Birthday Party Event" at an associated address and two of the user's friends are also intending to attend. In another non-limiting example, the user event context information 224-3 may indicate that the user is intending to attend a "Beyoncé® Concert Event" at an associated address where ten of the user's friends are also intending to attend.

In some embodiments, user interest context information 224-5 may identify at least one user interest context which may include, but is not limited to, one or more current interests (e.g., favorite artists, favorite movies, favorite music, favorite books, favorite sports, favorite locations, favorite food, etc.) of a user. The context determination component 246 may be configured to determine user interest context information 224-5 based at least partially on the user profile information 210 (e.g., user interest information, user search information, user biographic and/or demographic information, user event information, user group membership information, etc.) and/or calendar event information 214. In one non-limiting example, the interest context information may identify a user who shows an interest for a particular artist such as "Beyoncé®", when a user lists the particular artist as one of their favorite artists based on user interest information, is a member of one or more groups associated with a particular artist or that genre of music by the particular artist based on the user group membership information, is located within the same hometown as the particular artist based on the user biographic and/or demographic information, intends to attend an event by that particular artist based at least partially on user profile information 210 (e.g., user event information, etc.) and/or calendar event information 214, and/or is frequently searched by the user in the social networking system 101 based at least partially on user profile information 210 (e.g., user search information, etc.).

In some embodiments, user communication context information 224-1 may identify at least one current or recent user communication context which may include, but is not limited to, recent conversation topic(s) that is being discussed between a user with one or more other users and the social relationship with respect to the one or more users. The context determination component 246 may be configured to determine the user communication context information 224-1 based at least partially on user social messages information, user profile discussion information, and/or user social connections information. Moreover, the context determination component 246 may analyze one or more social messages to identify one or more "triggers" such as, for example, one or more keywords and/or other content (e.g., composite overlay images and/or videos shared between users) to identify conversation topics. In one non-limiting example, the user communication context information 224-1 may identify that the user is currently or was recently discussing about art galleries with another user in the social networking system 101 who is identified as their spouse. In another non-limiting example, the user communication context information 224-1 may identify that the user is currently or was recently discussing about artist "Beyoncé®", when the user recently posted on his profile a particular artist utilizing for example a @mention (e.g., "@Beyoncé®", etc.) or in a social message to one or more users in the social networking system 101 identified as their friend.

In some embodiments, user external event context information 224-4 may identify at least one user external event context which may include, but is not limited to, one or more current external events in one or more regions associated with the user's current location. The context determination component 246 may be configured to determine the user external event context information 224-4 by retrieving information from one or more network accessible sources (e.g., websites such as Wikipedia, datastores, etc.) utilizing one or more APIs of the one or more network accessible sources. These current events may include, but are not limited to, weather events for indicating the current weather (e.g., sunny, partly cloudy, rain, thunderstorm, snow, etc.) and associated temperature with respect to the user's location, sports events for indicating the current local sports and/or global sports games currently being played (e.g., a World Cup Soccer Game currently being played between Germany and Argentina, etc.), holiday events for indicating the current holiday (e.g., Christmas, Halloween, Veterans Day, etc.) or any other events that may be common to some or all users within one or more regions associated with the user's current location.

In some embodiments, after the context determination component 246 determines the user context information 224, the overlay selection component 248 may be configured to determine a list of aggregate overlay information 230. As discussed above and elsewhere, each aggregate overlay information in the list of aggregate overlay information 230 may include at least one overlay element identifier that identifies at least one overlay UI element stored in the overlay datastore 112-3 and utilized by the overlay component 190 to render and/or visually present one or more UI views (e.g., composite overlay preview UI views, composite overlay preview UI element, composite overlay UI views, etc.), composite overlay images, and/or composite overlay videos.

In some embodiments, the overlay selection component 248 may be configured to generate a list of aggregate overlay information including one or more overlay element identifiers based at least partially on third party overlay collection 218-1, social overlay collection 218-2, user overlay collection 218-3, overlay promotion information 219, user profile information 210 (e.g., user overlay ownership information, user overlay usage information, etc.), and/or the user context information 224.

The third party overlay collection 218-1 may include, but is not limited to, overlay element information representative of overlay UI elements that are associated with third party entities (e.g., entities that do not operate the social networking system 101) such as, for example, Starbucks™, McDonald™, Disney™, or any other third party entity based at least partially on overlay source information.

The social overlay collection 218-2 may include, but is not limited to, overlay element information representative of overlay UI elements that are associated with the social networking system 101 (e.g., entities that operates the social networking system 101) such as, for example, Facebook™, LinkedIn™, MySpace™, or any other social networking entity based at least partially on overlay source information.

The user overlay collection 218-3 may include, but is not limited to, overlay element information representative of overlay UI elements that are user created or user customized by one or more users of the social networking system 101 based at least partially on overlay source information.

In some embodiments, the overlay selection component 248 may be configured to select at least one overlay UI element from the one or more overlay UI elements included in third party overlay collection 218-1, social overlay collection 218-2, and/or user overlay collection 218-3. Additionally, in order to provide user with exposure to various overlay UI elements, the overlay selection component 248 may be configured to select a predetermined number (e.g., 5, 10, 15, etc.) of overlay UI elements from third party overlay collection 218-1, a predetermined number (e.g., 5, 10, 15, etc.) of overlay UI elements from a social overlay collection 218-2, and/or a predetermined number (e.g., 5, 10, 15, etc.) of overlay UI elements from a user overlay collection 218-3. The overlay selection component 248 may select the at least one overlay UI element by searching the third party overlay collection 218-1, the social overlay collection 218-2, and/or the user overlay collection 218-3, for at least one overlay UI element having overlay context information including one or more context terms that approximately matches the one or more contexts indicated in the user context information 224 (e.g., at least one context term matches at least one context).

In one non-limiting example, the overlay selection component 248 may be configured to select an overlay UI element representative of an art frame (e.g., overlay UI element 254-3) having an overlay context information with one or more terms indicating that associated context for the overlay UI element includes, but is not limited to, "art gallery" and/or "art galleries", when the user communications context information 224-1 indicates that the user is currently discussing art galleries with their friend via one or more social messages.

In one non-limiting example, the overlay selection component 248 may be configured to select an overlay UI element representative of a Heart (e.g., overlay UI element 254-2) having an overlay context information with one or more terms indicating that associated context for the overlay UI element includes, but is not limited to, "Love" "Significant Other", "Heart", "Spouse", "Girl Friend", and/or "Boy Friend", when the user communications context information 224-1 indicates that the user is currently having a conversation with their spouse via one or more social messages.

In still another non-limiting example, the overlay selection component 248 may be configured to select an overlay UI element representative of a coffee cup (e.g., overlay UI element 254-1) having an overlay context information with one or more terms indicating that associated context for the overlay UI element includes, but is not limited to, "Coffee" and/or "Starbucks™", when the user location context information 224-2 indicates that the user and their mobile device 102-1 are currently located at a Starbucks™.

In yet another non-limiting example, the overlay selection component 248 may be configured to select an overlay UI element representative of two party hats (e.g., overlay UI element 254-6) having overlay multi-person information indicating that the overlay UI element is appropriate for two persons and an overlay context information with one or more terms indicating that associated context for the overlay UI element includes, but is not limited to, "Hats", "Birthday", and/or "Party", when the user location context information 224-2 correlated with the user event context information 224-3 indicates that the user and their mobile device 102-1 are currently located at a "Birthday Party Event" with an associated address where two of the user's friends are also attending the "Birthday Party Event."

In a further non-limiting example, the overlay selection component 248 may be configured to select an overlay UI element representative of rain clouds (e.g., overlay UI element 254-8) having an overlay context information with one or more terms indicating that associated context for the overlay UI element includes, but is not limited to, "Rain" and/or "Rain Clouds", when the user external event context information 224-4 indicates that the current weather is rain at a location and local time associated with the mobile device 102-1 of the user.

In yet a further non-limiting example, the overlay selection component 248 may be configured to select an overlay UI element representative of Mickey Mouse™ holding an Umbrella (not shown) having an overlay context information with one or more terms indicating that associated context for the overlay UI element includes, but is not limited to, "Rain" and/or "Disney™", "Mickey Mouse™", when the user external event context information 224-4 indicates that the current weather is rain at a location and local time associated with the mobile device 102-1 of the user and the user location context information 224-2 indicates that the user and their mobile device 102-1 are currently at "Disneyland Park" with an associated address.

In yet another non-limiting example, the overlay selection component 248 may be configured to select an overlay UI element representative of Mickey Mouse™ holding an Umbrella and having an overlay context information with one or more terms indicating that associated context for the overlay UI element includes, but is not limited to, "Disneyland Park™", "Disneyland™", "Umbrella", "Rain", "Disney™", and/or "Mickey Mouse™", when the user external event context information 224-4 indicates that the current weather is rain at a location and local time associated with the device such as, for example, the mobile device 102-1 of the user and the user location context information 224-2 indicates that the user and their mobile device 102-1 are currently at "Disneyland Park" with an associated address.

In yet another non-limiting example, the overlay selection component 248 may be configured to select an overlay UI element representative of a Compact Disc and a musical note (e.g., overlay UI element 254-5) having an overlay context information with one or more terms indicating that associated context for the overlay UI element includes, but is not limited to, "Music", "Compact Disc", "Music Artist", and/or "Pop Music", when the user interest context information 224-5 indicates that the user likes music or likes one or more music artists such as "Beyoncé®".

In some embodiments, the overlay selection component 248 may be configured to bias the selection of overlay UI elements by limiting the selection of overlay UI elements from the third party overlay collection 218-1 to selecting only or exclusively overlay UI elements having overlay source information and/or overlay context information that are identified in the overlay promotion information 219. Moreover, the overlay promotion information 219 may include, but is not limited to promotion source information and promotion context information. The promotion source information may include, but is not limited to, one or more affiliates or sponsors (e.g., commercial entities, non-profit entities, government entities, etc.) that may have provided incentives (e.g., paid financial incentives) and/or pecuniary interests to the operators of the social networking system 101 and may correspond to one or more promotion contexts represented by promotion context information for a particular context the affiliates or sponsor is interested in promoting (e.g., coffee, music, etc.). This may enable affiliates or sponsors to promote their overlay UI elements in a particular context (e.g., Starbucks™ promoting their coffee, etc.) as a means of increasing brand recognition by advertisement via sharing of one or more sponsored overlay UI elements.

After selecting one or more overlay UI elements, in the overlay selection component 248 may be configured to sort and/or rank the one or more selected overlay UI elements based at least partially on popularity. In some embodiments, the overlay selection component 248 may be configured to sort and/or rank by starting with the most popular UI elements in a set time period (e.g., one day, one week, one month, one year, all time, etc.) based at least on the overlay popularity information associated with each overlay UI element that were selected. Moreover, the overlay popularity information may include, but is not limited to, values indicating the number of times a particular overlay UI element has been shared between and among users in a set time period such as, for example, one day, one week, one month, one year, all time, and/or any other set time period. Accordingly, by sorting and/or ranking the selected overlay UI elements based at least partially on the overlay popularity information associated with each selected overlay UI element, a user may be visually presented with the popular overlay UI elements first in the composite overlay preview UI view (e.g., composite overlay preview UI view 400).

Additionally or alternatively, the overlay selection component 248 may be configured to utilize well known machine learning algorithms to determine popularity of overlay UI elements between and among users having particular user profile information 210 (e.g., user demographic and/or biographic information, user interest information, etc.). In one non-limiting exemplary embodiment, the overlay selection component 248 may determine an ideal collection of biographic, demographic, and/or interest information for a user that is very likely to share a selected overlay UI element, i.e., an ideal overlay profile information associated with the overlay UI element utilizing well known machine learning algorithms based at least partially on the user profile information (e.g., user location information, etc.) for one or more users that shared the one or more overlay UI elements and identified by overlay popularity information (e.g., user profile identifier information included in the overlay popularity information) associated with the overlay UI element.

With continued reference to the above non-limiting exemplary embodiment, the overlay selection component 248 may then determine user profile based overlay popularity information for each selected overlay UI element by for example comparing the user profile information 210 (e.g., user demographic and/or biographic information, user interest information, etc.) of a user requesting the list of aggregate overlay element information 230 and/or user context information 224 with the ideal overlay profile information for a selected overlay UI element. The determined user profile based overlay popularity information may identify a popularity value (e.g., a normalized value from 1 to 100 where 100 being the most popular, etc.) of a specific overlay UI element for the user having specific user profile information 210, such as, for example, a user having user demographic and/or biographic information indicating that the user is a male between the age of 18 and 25 and user interest information indicating that the user likes music artist "Beyoncé®". The overlay selection component 248 may then sort and/rank by starting with the most popular overlay UI elements, including, but is not limited to, overlay UI elements that are sponsored by affiliates or sponsors (e.g., commercial entities such as "Beyoncé®", etc.), in a set time period based at least on the user profile based overlay popularity information for each selected overlay UI element. This may enable the overlay selection component 248 to provide the most popular overlay UI elements (e.g., most popular overlay UI element that matches artist "Beyoncé®") for a user having specific user profile information 210 (e.g., a male between age 18 and 25) first before the less popular overlay UI elements.

Additionally or alternatively, the overlay selection component 248 may be configured to sort and/or rank the selected overlay UI elements based at least partially on user profile information 210 (e.g., user overlay ownership information, user overlay usage information, etc.) and in particular, user overlay ownership information and/or user overlay usage information. Moreover, the overlay selection component 248 may be configured to sort and/or rank a predetermined number (e.g., 1, 2, 3, etc.) of selected overlay UI elements to the front of the list for any selected overlay UI elements that the user owns and/or has recently used as indicated by the user overlay ownership information and/or user overlay usage information. This may assist users in the management of overlay UI elements that user already owns and promote overlay UI elements that the user does not already own.

In some embodiments, after the overlay selection component 248 has selected, sorted, and/or ranked the overlay UI elements based at least partially on user profile information 210, user context information 224, and/or overlay promotion information 219, the overlay selection component 248 may generate the list of aggregate overlay information, where each aggregate overlay information may include at least one overlay element identifier corresponding to a selected overlay UI element. Additionally, in instances when the selected overlay UI elements are sorted and/or ranked, the most popular, the owned, and/or recently used overlay UI elements may be placed to the front of the list in accordance with the above discussion.

In some embodiments, each aggregate overlay information may also include more than one overlay element identifier (e.g., 2, 3, etc.) where more than one selected overlay UI elements may be combined up to a predefined maximum value (e.g., 2, 3, etc.). Moreover, the predefined maximum value may ensure that only some or few selected overlay UI elements are ultimately visually presented in a composite overlay UI element (e.g., composite overlay UI element 410-1-1) and/or one or more composite overlay UI views (e.g., composite overlay UI views 500, 520, 540, 560, etc.) on a mobile device (e.g., mobile device 102-1).

In some embodiments, after the list of aggregate overlay information has been generated, the social networking overlay management component 244 may transmit the generated list of aggregate overlay information 230 and user context information 224 to the mobile device (e.g., mobile device 102-1) associated with a user having an associated user profile information that requested the generation of the list of aggregate overlay information 230.

Figure 2B:
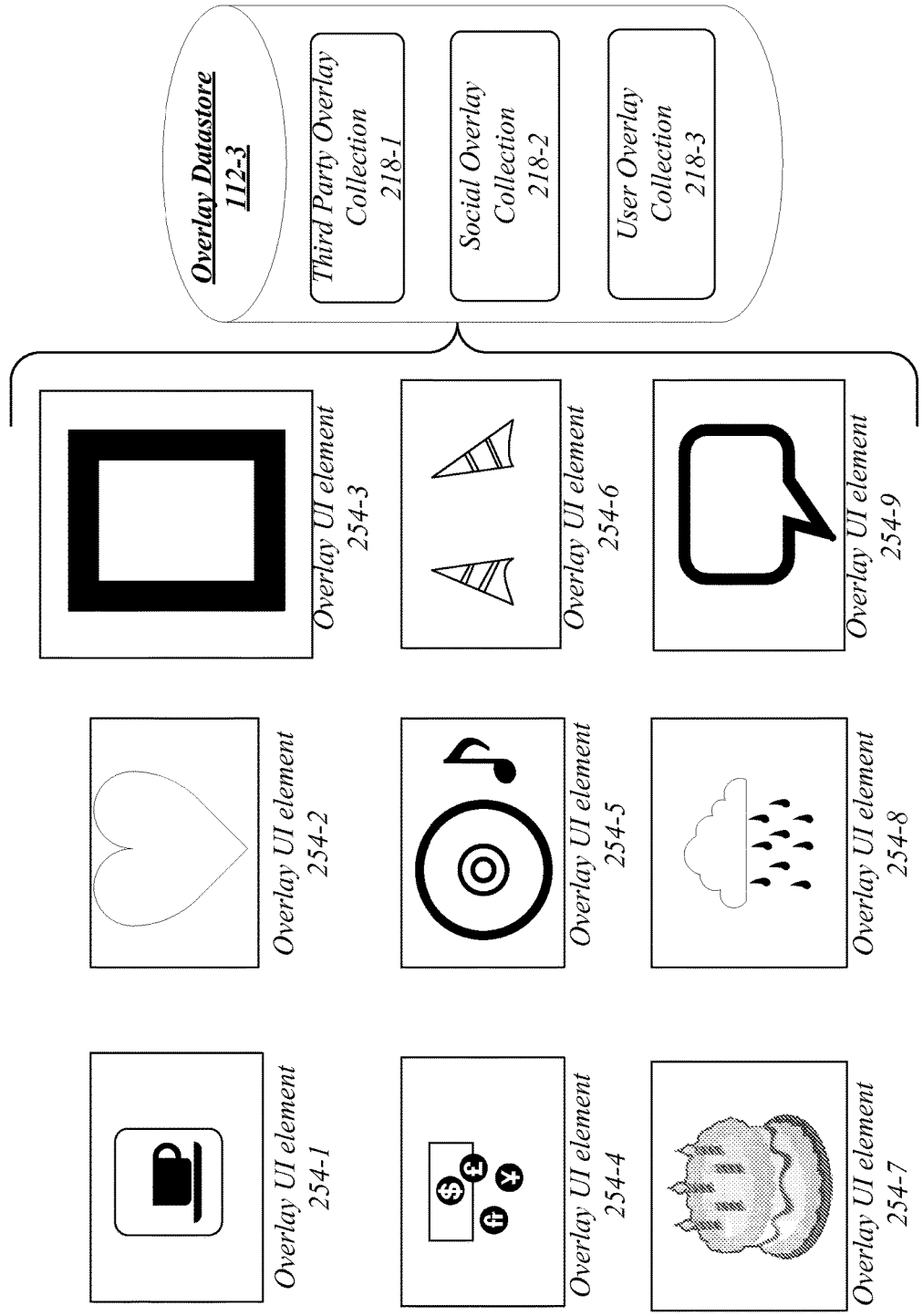
FIG. 2B illustrates an operating environment of overlay UI elements stored in an overlay datastore.

FIG. 2B illustrates an operating environment 250 of one or more overlay UI elements stored in an overlay datastore 112-3. As illustrated in FIG. 2B, the overlay datastore 112-3 which may include, but is not limited to, third party overlay collection 218-1, social overlay collection 218-2, and user overlay collection 218-3. As discussed above and/or elsewhere, third party overlay collection 218-1, social overlay collection 218-2, and user overlay collection 218-3 may each include but is not limited to overlay element information representative of one or more overlay UI elements 254-e.

The one or more overlay UI elements 254-e may include, but is not limited to, overlay UI elements 254-1 representative of a coffee cup, overlay UI element 254-2 representative of a heart, overlay UI element 254-3 representative of an art frame, overlay UI element 254-4 representative of currency, overlay UI element 254-5 representative of a Compact Disc and a musical note, overlay UI element 254-6 representative of a party hat or party hats, overlay UI element 254-7 representative of a birthday cake, overlay UI element 254-8 representative of rain, overlay UI element 254-9 representative of a text bubble, and/or any other overlay UI element that may be utilized to represent one or more user contexts as identified in the user context information 224.

It may be appreciated that while not illustrated, one or more of the overlay UI elements 254-e may be animated (e.g., animated gifs, videos with defined alpha regions, etc.). In one non-limiting example, the overlay UI element 254-8 representative of rain may include, but is not limited to, animated rain drops that fall from top to bottom.

FIG. 3 illustrates an exemplary image/video share user interface view 300. As illustrated in FIG. 3, the image/video share UI view 300, may include, but is not limited to, display screen 310, visual presentation of image and/or video information, i.e., background image and/or video 314, a selectable add overlay UI element 312, a selectable add image UI element 320, and/or a selectable share UI element 316.

In some embodiments, the image/video share user interface view 300 may be visually presented, when a user requests the messaging application 124-1-1 and/or social application 124-1-2 to visually present an image/video share UI view (e.g., image/video share UI view 300, etc.). This may occur when a user of a mobile device (e.g., mobile device 102-1, etc.) selects to transmit (e.g., transmit via one or more social messages, posts, etc.) an existing image and/or video information stored in an image datastore (not shown) of the system memory 120 and/or storage component 150. This may also occur, when a user of a mobile device (e.g., mobile device 102-1, etc.) selects to capture (e.g., transmit via one or more social messages, posts, etc.) a new image and/or video via image capture component 154.

The background image and/or video 314 may be representative of a live preview on display screen 310 of a user taking a picture of himself or herself utilizing the mobile device 102-1. To visually present the live preview, the overlay component 190 may receive image information and/or video information in near real time from the image capture component 154 of the mobile device 102-1 and render and visually present the captured image information and/or video information on the display screen 310 of mobile device 102-1 in near real time. Additionally or alternatively, background image and/or video 314 may be representative of image or video information previously stored in an image datastore (not shown) of the system memory 120 and/or storage component 150.

The selectable add overlay UI element 312 may be selected by a user utilizing a selection finger gesture to request a preview of one or more composite overlay UI views in a composite overlay preview UI view (e.g., composite overlay preview UI view 400) for addition to the background image/video 314. Additionally or alternatively, the add overlay UI element 312 may also be selected by a user utilizing a selection finger gesture to request to add one or more overlay UI elements (i.e., an add overlay UI element request discussed above and/or elsewhere).

The selectable add image UI element 320 may be selected by a user utilizing a selection finger gesture to request to add an additional image in the image/video share user interface view 300 and/or in a composite overlay preview UI view (e.g., composite overlay preview UI view 400) as discussed above and/or elsewhere.

The selectable share UI element 316 may be selected by a user utilizing a selection finger gesture to request the overlay management component 190-1 to share a composite overlay image or composite overlay video as substantially visually presented in the image/video share UI view 300 and/or one or more composite overlay UI views (e.g., composite overlay UI views 500, 520, 540, 560, etc.) excluding selectable add overlay UI element 312, a selectable add image UI element 320, and/or a selectable share UI element 316.

FIG. 4 illustrates a composite overlay preview user interface view 400. As illustrated in FIG. 4, the composite overlay preview UI view 400, which may be a scrollable composite overlay preview UI view 400 and may include, but is not limited to one or more selectable composite overlay UI elements 410-m-n arranged in a 3 by 3 grid and a selectable create overlay UI element 412. To enable a user to preview additional overlay UI elements that are not currently visually presented in the scrollable composite overlay preview UI view 400, the user may scroll (e.g., up, down, left, or right, etc.) utilizing a scroll finger gesture in the composite overlay preview UI view 400 to request additional composite overlay UI elements 410-m-n to be visually presented in the composite overlay review UI view 400.

Each selectable composite overlay UI element correspond to each aggregate overlay information in the list of aggregate overlay information 230. Accordingly, each selectable composite overlay UI element may also include a rendered visual presentation of at least one overlay UI element such as overlay UI element 254-8 representative of rain as applied in background image and/or video 314. As discussed above and elsewhere, each selectable composite overlay UI elements may be positioned, oriented, and/or proportioned based at least partially on the features detected in the background image and/or video 314 and overlay feature alignment information associated with each overlay UI element.

In instances when the list of aggregate overlay information 230 is sorted and/or ranked, the front of that list of aggregate overlay information 230 (e.g., the most popular, etc.) may correspond to the top left corner of the 3 by 3 grid (e.g., composite overlay UI element 410-1-1) where the remaining aggregate overlay information may correspond to other composite overlay UI elements in the same row (e.g., composite overlay UI element 410-1-2, 410-1-3, etc.) then on wards to the next row of composite overlay UI elements (e.g., composite overlay UI element 410-2-1, 410-2-2, 410-2-3, etc.) and so forth.

The selectable create overlay UI element 412 may be selected by a user utilizing a selection finger gesture to enable a user to create their own overlay UI element by adding a new existing image or animated image or video or create a new overlay UI element by drawing a new overlay UI element in one or more UI views (not shown) utilizing one or more finger gestures.

FIGS. 5A-5D illustrate embodiments of composite overlay user interface views 500, 520, 540, 560, which may be scrollable, composite overlay UI views 500, 520, 540, 560. Moreover, the scrollable composite overlay UI views 500, 520, 540, 560 may enable a user to preview additional composite overlay UI views that includes varying overlay UI elements, utilizing a scroll finger gesture in the composite overlay UI views 500, 520, 540, and/or 560 to scroll (e.g., up, down, left, or right, etc.) and cycle between various composite overlay UI views 500, 520, 540, and/or 560. Additionally, each composite overlay UI view (e.g., composite overlay UI view 500) may also correspond to a composite overlay UI element (e.g., composite overlay UI element 410-1-1) of the composite overlay preview UI view 400.

As illustrated in FIGS. 5A-5D, one or more overlay UI elements 210-e visually presented in the composite overlay UI views 500, 520, 540, 560, may be a movable and/or editable overlay UI elements 210-e. This may enable a user to move the one or more overlay UI elements 210-e to various positions on the display screen 310 utilizing a movement finger gesture. Additionally, this may also enable a user to edit one or more attributes (e.g., overlay color information, overlay text information, overlay illustrated graphical UI elements information, etc.) associated with the one or more overlay UI elements 210-e utilizing an edit finger gesture to begin editing one or more attributes of an overlay UI element. It may be appreciated that while some or most overlay UI elements in composite overlay UI views are generally visually presented to be on top of the background image/video, the one or more overlay UI elements 210-e may also be visually presented behind the background image and/or video as desired.

Figure 5B:
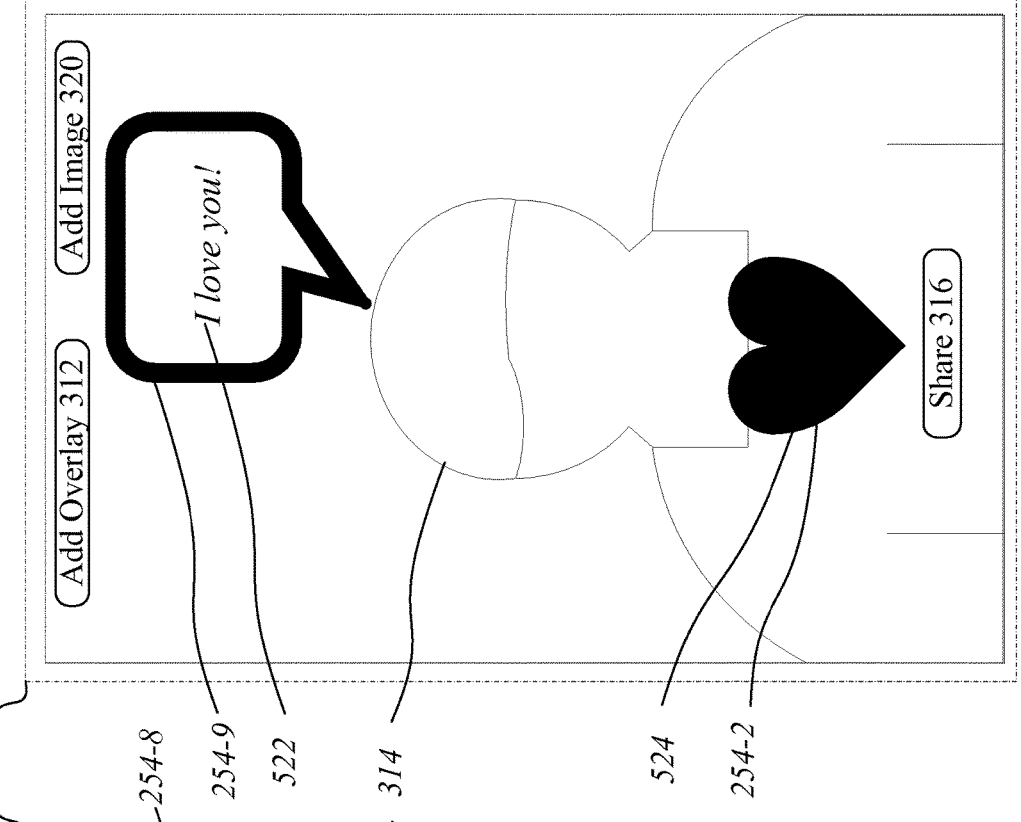
FIGS. 5A-5D illustrate embodiments of composite overlay user interface views.
Figure 5A:
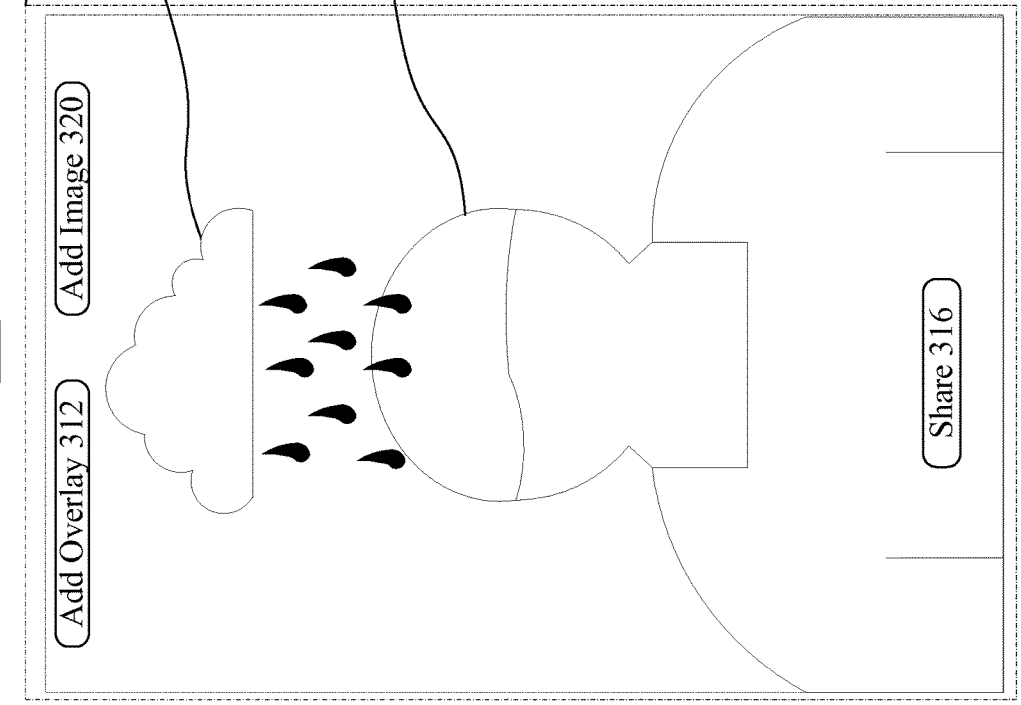

As illustrated in FIG. 5A, the composite overlay UI view 500 may be representative of a user utilizing his or her mobile device 102-1 to take a picture or video of himself or herself for sharing via one or more social messages or posts. Additionally, the current weather at the user's location may indicate that it is currently raining. As such, the user external event context information 224-4 may indicate that the current weather at the location and local time associated with the mobile device 102-1 is rain. Accordingly, a suggested context sensitive overlay UI element as illustrated in the composite overlay UI view 500 may include, but is not limited to, overlay UI element 254-8 representative of rain.

As illustrated in FIG. 5B, the composite overlay UI view 520 may be representative of a user utilizing his or her mobile device 102-1 to take a picture or video of himself or herself to share with his or her spouse via one or more social messages. As such, the associated user communications context information 224-1 may indicates the user is currently having a conversation with their spouse via one or more social messages. Accordingly, the suggested context sensitive overlay UI elements as illustrated in the composite overlay UI view 520 may include, but is not limited to, overlay UI element 254-2 representative of a heart and a suggested conversation bubble with associated overlay text 522 of "I Love You!" Additionally, as discussed above and/or elsewhere, the user may also begin to modify one or more attributes such as, for example, the overlay color 524 of overlay UI element 254-2 representative of the heart utilizing a edit finger gesture and selecting and selecting a new overlay color using one or more UI elements (not shown).

Figure 5C:
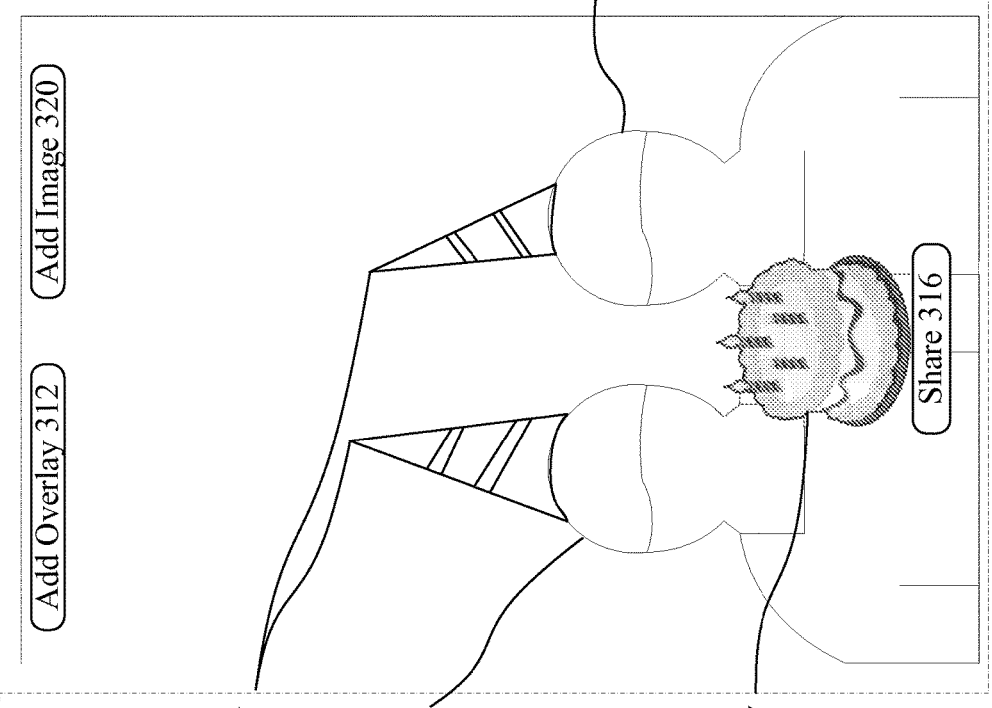

As illustrated in FIG. 5C, the composite overlay UI view 540 may be representative of a user utilizing his or her mobile device 102-1 to take a picture or video of himself or herself to share with his or her friends while currently attending his or her own birthday party event and discussing, via one or more social messages, that received money as a gift. As such, the associated user communications context information 224-1 may indicate that the user is currently having a conversation with their friends via one or more social messages about money and the associated location context information 224-2 may indicate that the user is currently attending a birthday party event. Accordingly, the suggested context sensitive overlay UI elements as illustrated in the composite overlay UI view 540 may include, but is not limited to, overlay UI element 254-7 representative of a birthday cake, and overlay UI element 254-4 representative of currency or money.

Figure 5D:
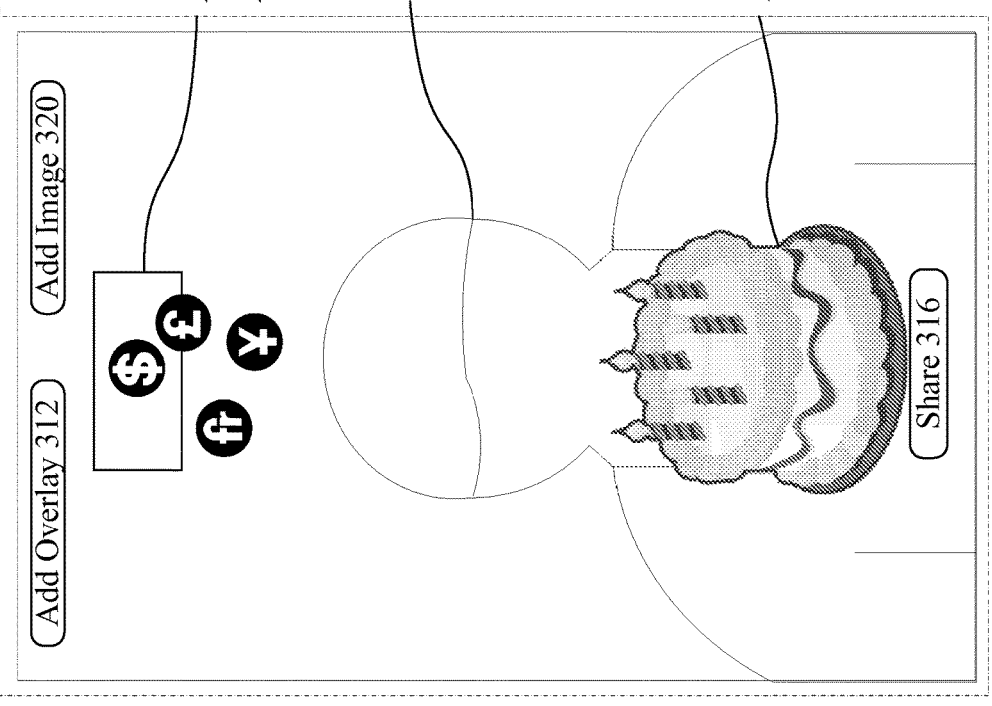

As illustrated in FIG. 5D, the composite overlay UI view 540 may be representative of a user utilizing his or her mobile device 102-1 to take a picture or video of himself or herself to share with his or her friends while currently attending his or her own birthday party event where two or more of the user's friends are also at the location of the event. As such, the associated user location context information 224-2 may indicate that the user is currently attending a birthday party event and the user event context information 224-3 may indicate that there are currently four friends of the user also attending the birthday party event. Accordingly, the one or more suggested context sensitive overlay UI elements as illustrated in the composite overlay UI view 540 may include, but is not limited to, overlay UI element 254-6 representative of party hats which may be used for two persons and overlay UI element 254-7 representative of a birthday cake. Additionally, the user may also add a new image 564 representative of a friend who couldn't make it to the birthday party event utilizing the selectable add image UI element 320. This may enable the user to create a shareable composite overlay image or video that may combine images from multiple users who are currently separated.

Figure 6:
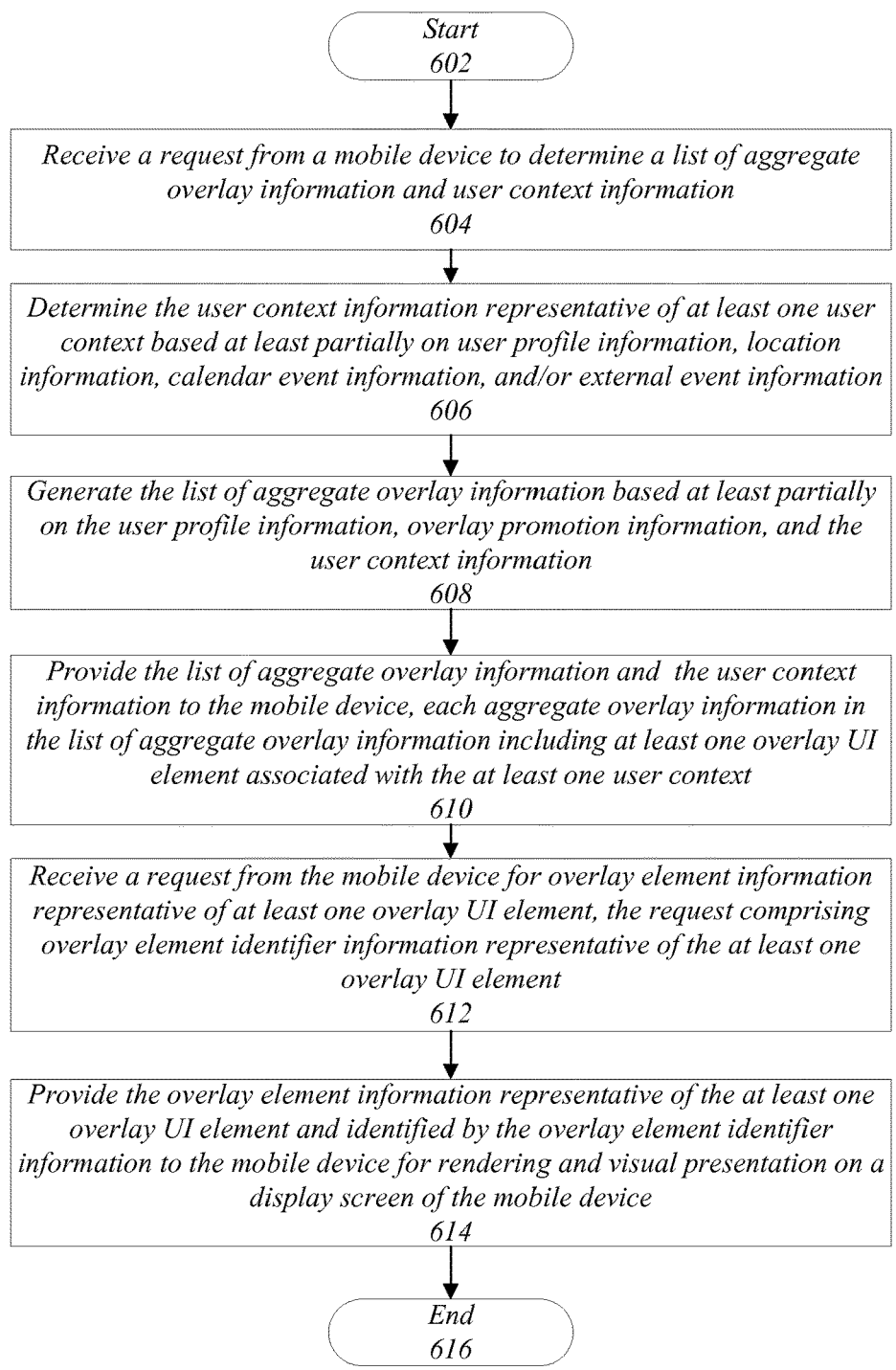
FIG. 6 illustrates an exemplary logic flow for at least determining list of aggregate overlay information and user context information.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover FIG. 6 illustrates one embodiment of a logic flow 600. The logic flow 600 may be representative of some or all of the operations executed by one or more embodiments described herein.

In the illustrated embodiment shown in FIG. 6, the logic flow 600 may start at block 602 and may receive a request from a mobile device to determine a list of aggregate overlay information and user context information at step 604. For example, social networking overlay management component 244 may receive a request from mobile device 102-1 to determine a list of aggregate overlay information 230 and user context information 224.

The logic flow 600 may determine the user context information representative of at least one user context based at least partially on user profile information, location information, calendar event information, and/or external event information at 406. For example, context determination component 246 may determine the user context information 224 representative of at least one user context based at least partially on user profile information 210, location information 212, calendar event information 214, and/or external event information 216.

The logic flow 600 may generate the list of aggregate overlay information based at least partially on the user profile information, overlay promotion information, and the user context information at 608. For example, overlay selection component 248 may generate the list of aggregate overlay information 230 based at least partially on the user profile information 210, overlay promotion information 219, and the user context information 224.

The logic flow 600 may provide the list of aggregate overlay information and the user context information to the mobile device, each aggregate overlay information in the list of aggregate overlay information including at least one overlay UI element associated with the at least one user context at 610. For example, the social networking overlay management component 244 may provide the list of aggregate overlay information 230 and the user context information 224 to the mobile device 102-1, each aggregate overlay information in the list of aggregate overlay information 230 including at least one overlay UI element (e.g., overlay UI element 254-8) associated with the at least one user context.

The logic flow 600 may receive a request from the mobile device for overlay element information representative of at least one overlay UI element, the request comprising overlay element identifier information representative of the at least one overlay UI element at 612. For example, social networking overlay management component 244 may receive a request from the mobile device 102-1 for overlay element information representative of at least one overlay UI element (e.g., overlay UI element 254-8), the request comprising overlay element identifier information representative of the at least one overlay UI element.

The logic flow 600 may provide the overlay element information representative of the at least one overlay UI element and identified by the overlay element identifier information to the mobile device for rendering and visual presentation on a display screen of the mobile device at 614 and end at 616. For example, social networking overlay management component 244 may provide the overlay element information representative of the at least one overlay UI element (e.g., overlay UI element 254-8) and identified by the overlay element identifier information to the mobile device 102-1 for rendering and visual presentation on a display screen 310 of the mobile device 102-1. The examples are not limited in this context.

Included herein is a set of non-limiting exemplary embodiments that is representative of at least some of the novel aspects of the disclosed architecture. It may be appreciated that not all exemplary embodiments are necessary for a novel implementation and in at least some of the non-limiting exemplary embodiments, the one or more components, instructions, steps, elements including, but are not limited to, UI elements, and/or features may vary based at least partially on one or more implementations.

In one non-limiting exemplary embodiment, the disclosed architecture may include, but is not limited to, a computer implemented method, comprising the steps of receiving a request to preview at least one composite overlay user interface (UI) view in a composite overlay preview UI view; requesting a social networking overlay component of a social networking application for a list of aggregate overlay information by generating a request for the list of aggregate overlay information, in response to the received request to preview the at least one composite overlay UI views; receiving the list of aggregate overlay information from the social networking overlay component, wherein each aggregate overlay information of the list of aggregate overlay information comprises at least one overlay element identifier that identifies at least one overlay UI element represented by overlay element information; and presenting, visually, on a display screen of a mobile device the at least overlay UI element in the at least one composite overlay UI element of the composite overlay preview UI view based at least partially on the overlay element information representative of the at least overlay UI element.

With continued reference to above non-limiting exemplary embodiment of the computer-implemented method, the computer implemented method may further comprise the steps of receiving a request from a user to visually present a composite overlay UI view comprising the at least one overlay UI element; and presenting, visually, the overlay UI element in a composite overlay UI view based at least partially on the overlay element information, the image information, and/or video information, in response to the request to visually present the composite overlay UI view.

With continued reference to above non-limiting exemplary embodiment of the computer-implemented method, the computer implemented method may further comprise the step of generating shareable composite overlay information for sharing as at least one social message and/or at least one profile activity via the social networking system, wherein the shareable composite overlay information comprises a shareable image or shareable video, the at least one overlay UI element, and the background image represented by the image information or background video represented by the video information.

With continued reference to above non-limiting exemplary embodiment of the computer-implemented method, the computer implemented method may further comprise the step of modifying overlay position information, overlay size information, overlay orientation information associated with the at least one overlay UI element to align, orient, and/or proportion the at least one overlay UI element to at least one detected feature in a background image represented by the image information or background video represented by the video information.

With continued reference to above non-limiting exemplary embodiment of the computer-implemented method, the computer implemented method may further comprise the step of enabling modification of at least one attribute of the at least one overlay UI element, in response to receiving a request from a user to modify the at least one overlay attribute associated with the at least one overlay UI element in a composite overlay UI view.

With continued reference to above non-limiting exemplary embodiment of the computer-implemented method, the computer implemented method may further comprise the steps of receiving user context information from the social networking overlay component, wherein user context information comprises at least one of: user communication context information, user location context information, user event context information, user external event context information, user interest context information, or any combination thereof; and modifying at least one overlay attribute of the at least one overlay UI element represented by the overlay element information based at least partially on the received user context information.

With continued reference to above non-limiting exemplary embodiment of the computer-implemented method, the computer implemented method may further comprise the steps of requesting the overlay element information for at least one overlay UI element from the social networking overlay component based at least partially on the at least one overlay element identifier in at least one aggregate overlay information of the list of aggregate overlay information; and receiving the requested overlay element information for the at least one overlay UI element, in response to the request for overlay element information.

In the one non-limiting exemplary embodiment, the disclosed architecture may also include, but is not limited to, an apparatus, comprising a processor circuit; memory operatively coupled to the processor circuit, the memory to store a social application and/or messaging application, the social application and/or messaging application comprising an overlay component for execution by the processor circuit, the overlay component comprising an overlay management component to receive a request to preview at least one composite overlay user interface (UI) view in a composite overlay preview UI view, request a social networking overlay component of a social networking application for a list of aggregate overlay information by generating a request for the list of aggregate overlay information, in response to the received request to preview the at least one composite overlay UI views, and receive the list of aggregate overlay information from the social networking overlay component, wherein each aggregate overlay information of the list of aggregate overlay information comprises at least one overlay element identifier that identifies at least one overlay UI element represented by overlay element information, and an overlay rendering component to present, visually, on a display screen operatively coupled to the apparatus at least overlay UI element in the at least one composite overlay UI element of the composite overlay preview UI view based at least partially on the overlay element information representative of the at least overlay UI element.

With continued reference to the first non-limiting exemplary embodiment of the apparatus, wherein the overlay management component is to further receive a request from a user to visually present a composite overlay UI view comprising the at least one overlay UI element, and present, visually, the overlay UI element in a composite overlay UI view based at least partially on the overlay element information, the image information, and/or video information, in response to the request to visually present the composite overlay UI view.

With continued reference to the first non-limiting exemplary embodiment of the apparatus, wherein the overlay management component is to further generate shareable composite overlay information for sharing as at least one social message and/or at least one profile activity via the social networking system, wherein the shareable composite overlay information comprises a shareable image or shareable video, the at least one overlay UI element, and the background image represented by the image information or background video represented by the video information.

With continued reference to the first non-limiting exemplary embodiment of the apparatus, wherein the request for the list of aggregate overlay information comprises location information and/or calendar event information.

With continued reference to the first non-limiting exemplary embodiment of the apparatus, wherein the at least one overlay UI element having a cost indicated by an associated overlay commercialization information for purchase by a user.

With continued reference to the first non-limiting exemplary embodiment of the apparatus, wherein a request to preview at least one composite overlay UI view is received from the social application and/or the message application.

With continued reference to the first non-limiting exemplary embodiment of the apparatus, wherein the composite overlay preview UI view comprises a grid of at least one composite overlay UI element, each composite overlay element configured to visually present a particular composite overlay UI view.

In the one non-limiting exemplary embodiment, the disclosed architecture may further include, but is not limited to, at least one computer-readable storage medium comprising instructions that, when executed, cause a system to receive a request to preview at least one composite overlay user interface (UI) view in a composite overlay preview UI view, request a social networking overlay component of a social networking application for a list of aggregate overlay information by generating a request for the list of aggregate overlay information, in response to the received request to preview the at least one composite overlay UI views, receive the list of aggregate overlay information from the social networking overlay component, wherein each aggregate overlay information of the list of aggregate overlay information comprises at least one overlay element identifier that identifies at least one overlay UI element represented by overlay element information, and present, visually, on a display screen of a mobile device the at least overlay UI element in the at least one composite overlay UI element of the composite overlay preview UI view based at least partially on the overlay element information representative of the at least overlay UI element.

With continued reference to the first non-limiting exemplary embodiment of the at least one computer-readable storage medium, wherein the instructions, when executed, further cause the system to generate shareable composite overlay information for sharing as at least one social message and/or at least one profile activity via the social networking system, wherein the shareable composite overlay information comprises a shareable image or shareable video, the at least one overlay UI element, and the background image represented by the image information or background video represented by the video information.

With continued reference to the first non-limiting exemplary embodiment of the at least one computer-readable storage medium, wherein the instructions, when executed, further cause the system to modify overlay position information, overlay size information, overlay orientation information associated with the at least one overlay UI element to align, orient, and/or proportion the at least one overlay UI element to at least one detected feature in a background image represented by the image information or background video represented by the video information.

With continued reference to the first non-limiting exemplary embodiment of the at least one computer-readable storage medium, wherein the instructions, when executed, further cause the system to modify overlay position information receive user context information from the social networking overlay component, wherein user context information comprises at least one of: user communication context information, user location context information, user event context information, user external event context information, user interest context information, or any combination thereof, and modify at least one overlay attribute of the at least one overlay UI element represented by the overlay element information based at least partially on the received user context information.

With continued reference to the first non-limiting exemplary embodiment of the at least one computer-readable storage medium, wherein the instructions, when executed, further cause the system to request the overlay element information for at least one overlay UI element from the social networking overlay component based at least partially on the at least one overlay element identifier in at least one aggregate overlay information of the list of aggregate overlay information, and receive the requested overlay element information for the at least one overlay UI element, in response to the request for overlay element information.

Figure 7:
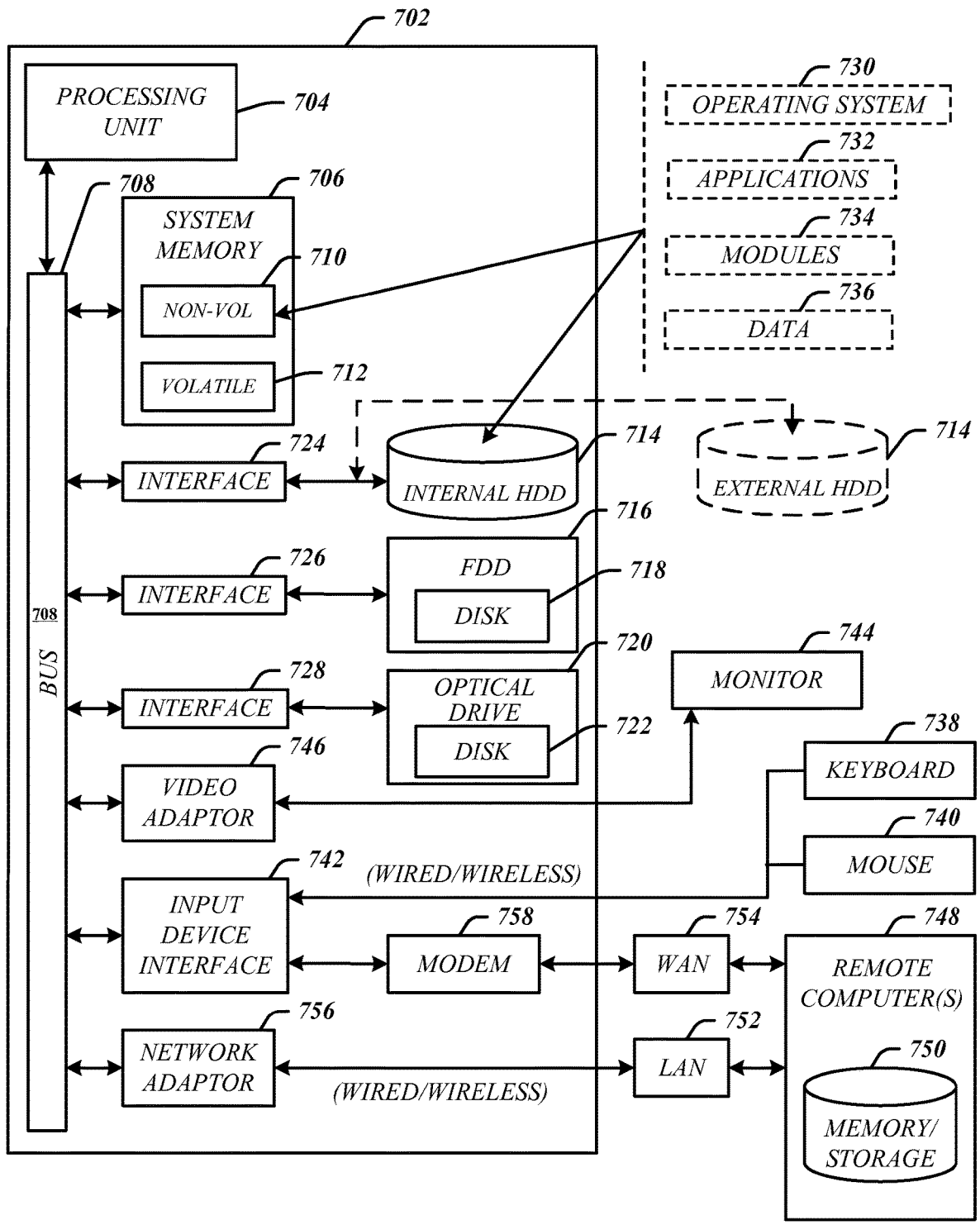
FIG. 7 illustrates an exemplary embodiment of a computing architecture.

FIG. 7 illustrates an embodiment of an exemplary computing architecture 700 suitable for implementing various embodiments as previously described, such as, for example server device 106 and/or one or more devices 102-*a*. In one embodiment, the computing architecture 700 may comprise or be implemented as part of an electronic device. In another embodiment, the computer architecture 700 may be implemented as part of a cloud computing platform as a physical machine or virtual machine in a network of one or more physical and/or virtual machines. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms 'first,' "second," 'third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method comprising:
 capturing, at a client device, an image;
 determining a plurality of graphical user interface overlay elements for the image;
 creating a plurality of composite overlay user interface views by, for each composite overlay user interface view, overlaying one or more graphical user interface overlay elements from the plurality of graphical user interface overlay elements on the image;
 displaying simultaneously a plurality of composite overlay previews within a preview interface displayed on the client device, each composite overlay preview including a visual representation of a corresponding composite overlay user interface view from the plurality of composite overlay user interface views;
 detecting a selection of a composite overlay preview from the plurality of composite overlay previews displayed within the preview interface; and
 providing for display, in response to detecting the selection, a composite overlay user interface view corresponding to the composite overlay preview.

2. The computer-implemented method as recited in claim 1, further comprising generating a ranking of the plurality of composite overlay user interface views and providing the plurality of composite overlay previews within the preview interface in an order based on the ranking.

3. The computer-implemented method as recited in claim 1,
further comprising determining context information for the image; and
wherein determining the plurality of graphical user interface overlay elements for the image comprises determining the plurality of graphical user interface overlay elements based on the context information for the image.

4. The computer-implemented method as recited in claim 3, wherein:
determining the context information for the image comprises determining a current location of the client device; and
determining the plurality of graphical user interface overlay elements based on the context information for the image comprises determining one or more graphical user interface overlay elements associated with the current location.

5. The computer-implemented method as recited in claim 4, wherein determining the one or more graphical user interface overlay elements associated with the current location comprises determining at least one of a graphical user interface overlay element corresponding to current weather at the current location or a graphical user interface overlay element with a name of a location proximate to the current location.

6. The computer-implemented method as recited in claim 1, further comprising:
performing facial detection on the image; and
positioning at least one graphical user interface overlay element on the image based on a location of one or more detected facial features.

7. The computer-implemented method as recited in claim 1, wherein the plurality of graphical user interface overlay elements comprises one or more of filters, overlays, animations, or props.

8. A non-transitory computer-readable medium storing instructions thereon that, when executed by at least one processor, cause a computing device to perform acts comprising:
capturing, at the computing device, an image;
determining a plurality of graphical user interface overlay elements for the image;
creating a plurality of composite overlay user interface views by, for each composite overlay user interface view, overlaying one or more graphical user interface overlay elements from the plurality of graphical user interface overlay elements on the image;
displaying simultaneously a plurality of composite overlay previews within a preview interface displayed on the computing device, each composite overlay preview including a visual representation of a corresponding composite overlay user interface view from the plurality of composite overlay user interface views;
detecting a selection of a composite overlay preview from the plurality of composite overlay previews displayed within the preview interface; and
providing for display, in response to detecting the selection, a composite overlay user interface view corresponding to the composite overlay preview.

9. The non-transitory computer-readable medium as recited in claim 8, wherein:

the instructions, when executed by the at least one processor, cause the computing device to perform the acts comprising determining context information for the image; and
determining the plurality of graphical user interface overlay elements for the image comprises determining the plurality of graphical user interface overlay elements based on the context information for the image.

10. The non-transitory computer-readable medium as recited in claim 9, wherein:
determining the context information for the image comprises determining one or more interests of a user associated with the computing device; and
determining the plurality of graphical user interface overlay elements based on the context information for the image comprises determining at least one graphical user interface overlay element indicating the one or more interests of the user.

11. The non-transitory computer-readable medium as recited in claim 9, wherein determining the plurality of graphical user interface overlay elements based on the context information for the image comprises generating at least one graphical user interface overlay element based on the context information for the image.

12. The non-transitory computer-readable medium as recited in claim 8, wherein determining the plurality of graphical user interface overlay elements for the image comprises determining a sponsored graphical user interface overlay element.

13. A system comprising:
a touch screen device;
a camera; and
at least one processor that causes the system to:
capture, by the camera, an image;
determine a plurality of graphical user interface overlay elements for the image;
create a plurality of composite overlay user interface views by, for each composite overlay user interface view, overlaying one or more graphical user interface overlay elements from the plurality of graphical user interface overlay elements on the image;
display simultaneously a plurality of composite overlay previews within a preview interface displayed on the touch screen device, each composite overlay preview including a visual representation of a corresponding composite overlay user interface view from the plurality of composite overlay user interface views;
detect a selection of a composite overlay preview from the plurality of composite overlay previews displayed within the preview interface; and
provide for display, in response to detecting the selection, a composite overlay user interface view corresponding to the composite overlay preview.

14. The system as recited in claim 13, wherein the at least one processor further causes the system to share a selected composite overlay user interface view via a social networking system.

15. The system as recited in claim 13, wherein the at least one processor causes the system to determine the plurality of graphical user interface overlay elements for the image by selecting graphical user interface overlay elements with associated context terms that match context information for the image.

16. The system as recited in claim 13, wherein the at least one processor causes the system to determine the plurality of graphical user interface overlay elements for the image by generating a text element that indicates context information for the image.

17. The system as recited in claim 13, wherein the at least one processor causes the system to:
    capture, by the camera, the image by capturing a real-time video stream from the camera; and
    create the plurality of composite overlay user interface views by overlaying the one or more graphical user interface overlay elements on the real-time video stream.

18. The computer-implemented method as recited in claim 1, further comprising modifying a graphical user interface overlay element within the composite overlay user interface view in response to detecting one or more user interactions with the graphical user interface overlay element.

19. The computer-implemented method of claim 18, wherein modifying the graphical user interface overlay element comprises modifying at least one of a position of the graphical user interface overlay element within the composite overlay user interface view, a color of the graphical user interface overlay element, or a size of the graphical user interface overlay element.

20. The computer-implemented method of claim 1,
    wherein providing the plurality of composite overlay previews for display within the preview interface comprises providing a first subset of composite overlay previews from the plurality of composite overlay previews for display within the preview interface; and
    further comprising providing a second subset of composite overlay previews from the plurality of composite overlay previews for display within the preview interface in response to a user interaction with the preview interface.

* * * * *